United States Patent
Nakagawa et al.

(10) Patent No.: US 12,170,101 B2
(45) Date of Patent: Dec. 17, 2024

(54) MAGNETIC HEAD WITH MULTILAYER CONFIGURATION BETWEEN MAGNETIC POLES AND MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki Kanagawa (JP); Ryo Osamura, Kawasaki Kanagawa (JP); Masayuki Takagishi, Kunitachi Tokyo (JP); Naoyuki Narita, Funabashi Chiba (JP); Tomoyuki Maeda, Kawasaki Kanagawa (JP); Tazumi Nagasawa, Yokohama Kanagawa (JP); Kosuke Kurihara, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 18/358,875

(22) Filed: Jul. 25, 2023

(65) Prior Publication Data
US 2024/0296862 A1    Sep. 5, 2024

(30) Foreign Application Priority Data
Mar. 1, 2023  (JP) ................. 2023-031364

(51) Int. Cl.
G11B 5/31    (2006.01)
G11B 5/127   (2006.01)
(Continued)

(52) U.S. Cl.
CPC .......... *G11B 5/3146* (2013.01); *G11B 5/1278* (2013.01); *G11B 5/235* (2013.01);
(Continued)

(58) Field of Classification Search
None
See application file for complete search history.

(56) References Cited

U.S. PATENT DOCUMENTS 7,616,412 B2   11/2009  Zhu et al.
9,007,721 B2    4/2015  Sato et al.
(Continued)

FOREIGN PATENT DOCUMENTS

JP    2008-277586 A   11/2008
JP    2009-064499 A    3/2009
(Continued)

OTHER PUBLICATIONS

X. Bai and J.-G. Zhu, "Effective Field Analysis of Segmented Media for Microwave-Assisted Magnetic Recording", in IEEE Magnetics Letters, vol. 8, pp. 1-4, 2017.
(Continued)

*Primary Examiner* — Craig A. Renner
(74) *Attorney, Agent, or Firm* — Knobbe, Martens, Olson & Bear, LLP

(57) ABSTRACT

According to one embodiment, a magnetic head includes a first magnetic pole, a second magnetic pole, and a magnetic element provided between the first and the second magnetic poles. The magnetic element includes first to fifth magnetic layers, and first to sixth non-magnetic layers. The fifth magnetic layer includes a first element and at least one of Fe, Co or Ni. The first element includes at least one selected from the group consisting of Cr, V, Mn, Ti, N and Sc. The fifth non-magnetic layer includes at least one selected from the group consisting of Ru, Ir, Ta, Rh, Pd, Pt and W. The
(Continued)

sixth non-magnetic layer includes at least one selected from the group consisting of Cu, Au, Cr, Al, V and Ag.

13 Claims, 20 Drawing Sheets

(51) Int. Cl.
    *G11B 5/235*     (2006.01)
    *G11B 5/00*     (2006.01)
    *G11B 5/027*     (2006.01)

(52) U.S. Cl.
    CPC ...... *G11B 5/314* (2013.01); *G11B 2005/0024* (2013.01); *G11B 5/027* (2013.01); *G11B 2220/2516* (2013.01)

(56) References Cited

U.S. PATENT DOCUMENTS

| | | |
|---|---|---|
| 9,064,508 B1 | 6/2015 | Shiimoto et al. |
| 9,117,474 B1 | 8/2015 | Contreras et al. |
| 10,522,174 B1 | 12/2019 | Chen et al. |
| 10,937,450 B1 | 3/2021 | Kawasaki et al. |
| 11,393,493 B1 | 7/2022 | Nakagawa et al. |
| 11,398,244 B2 | 7/2022 | Takagishi et al. |
| 11,568,891 B1 | 1/2023 | Chen et al. |
| 2008/0019040 A1 | 1/2008 | Zhu et al. |
| 2008/0268291 A1 | 10/2008 | Akiyama et al. |
| 2009/0052095 A1 | 2/2009 | Yamada et al. |
| 2009/0059417 A1 | 3/2009 | Takeo et al. |
| 2012/0126905 A1 | 5/2012 | Zhang et al. |
| 2012/0164487 A1 | 6/2012 | Childress et al. |
| 2012/0176702 A1 | 7/2012 | Yamada et al. |
| 2013/0050869 A1 | 2/2013 | Nagasaka et al. |
| 2019/0088275 A1 | 3/2019 | Narita et al. |
| 2020/0294537 A1 | 9/2020 | Nagawawa et al. |
| 2021/0142821 A1 | 5/2021 | Iwasaki et al. |
| 2021/0375309 A1 | 12/2021 | Iwasaki et al. |
| 2022/0005497 A1 | 1/2022 | Takagishi et al. |
| 2022/0084551 A1 | 3/2022 | Koizumi |
| 2022/0157335 A1 | 5/2022 | Iwasaki et al. |
| 2022/0270640 A1 | 8/2022 | Nakagawa et al. |
| 2022/0270641 A1 | 8/2022 | Nakagawa et al. |
| 2022/0399035 A1 | 12/2022 | Goncharov et al. |
| 2023/0031273 A1 | 2/2023 | Nakagawa et al. |
| 2023/0046928 A1 | 2/2023 | Nakagawa et al. |
| 2023/0178102 A1 | 6/2023 | Nakagawa et al. |
| 2024/0029759 A1* | 1/2024 | Chen et al. .......... G11B 5/3146 |
| 2024/0144961 A1 | 5/2024 | Asif Bashir et al. |
| 2024/0144962 A1 | 5/2024 | Asif Bashir et al. |
| 2024/0144963 A1 | 5/2024 | Asif Bashir et al. |

FOREIGN PATENT DOCUMENTS

| | | |
|---|---|---|
| JP | 4358279 B2 | 11/2009 |
| JP | 2012-146351 A | 8/2012 |
| JP | 2019-057338 A | 4/2019 |
| JP | 2022-012263 A | 1/2022 |
| JP | 2022-050037 A | 3/2022 |
| JP | 2022-129730 A | 9/2022 |
| JP | 2023-083663 A | 6/2023 |

OTHER PUBLICATIONS

T. Tanaka, et al., "MAMR writability and signal-recording characteristics on granular exchange-coupled composite media" in Journal of Magnetism and Magnetic Materials 529 (2021).

Final Office Action of corresponding U.S. Appl. No. 18/363,613 issued on Apr. 22, 2024 in 9 pages.

Office Action of corresponding U.S. Appl. No. 18/358,872 issued on Jun. 18, 2024, 17 pages.

\* cited by examiner

MAGNETIC HEAD WITH MULTILAYER CONFIGURATION BETWEEN MAGNETIC POLES AND MAGNETIC RECORDING DEVICE

CROSS-REFERENCE TO RELATED APPLICATIONS

This application is based upon and claims the benefit of priority from Japanese Patent Application No. 2023-031364, filed on Mar. 1, 2023; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head. It is desired to improve recording density in the magnetic recording device.

DETAILED DESCRIPTION

Figure 1:
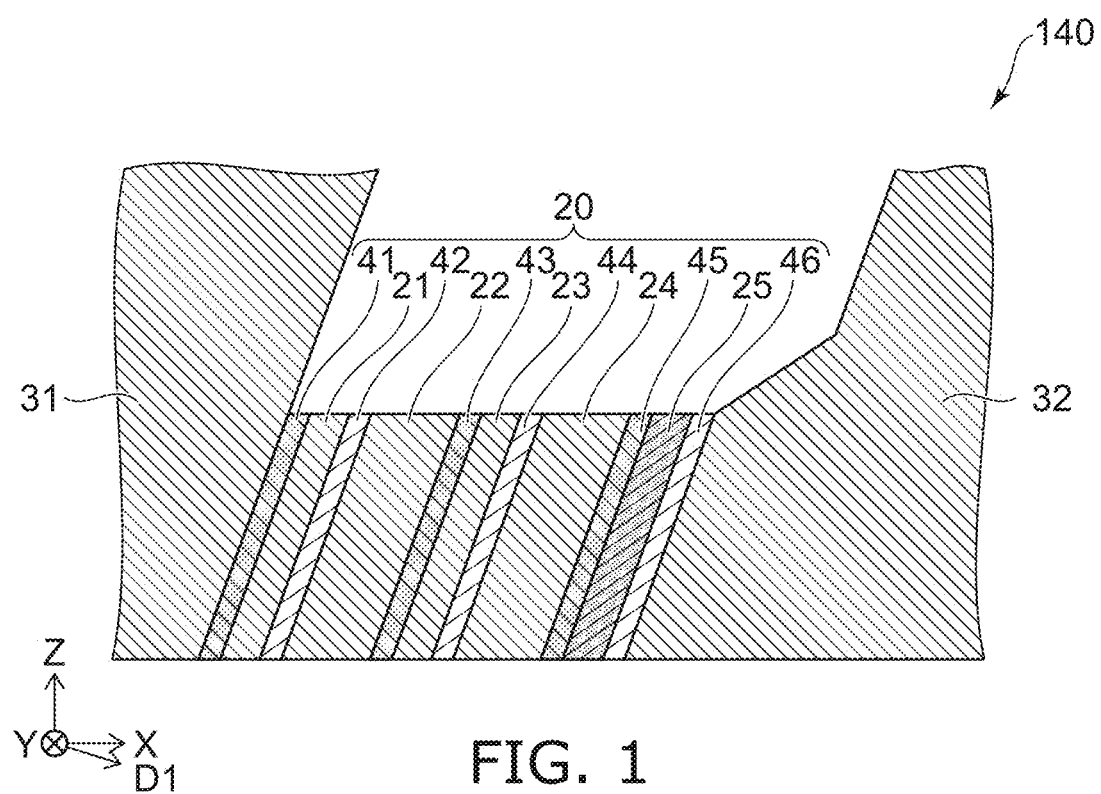
FIG. 1 is a schematic cross-sectional view illustrating a magnetic head according to a first embodiment.

According to one embodiment, a magnetic head includes a first magnetic pole, a second magnetic pole, and a magnetic element provided between the first magnetic pole and the second magnetic pole. The magnetic element includes a first magnetic layer, a second magnetic layer provided between the first magnetic layer and the second magnetic pole, a third magnetic layer provided between the second magnetic layer and the second magnetic pole, a fourth magnetic layer provided between the third magnetic layer and the second magnetic pole, a fifth magnetic layer provided between the fourth magnetic layer and the second magnetic pole, a first non-magnetic layer provided between the first magnetic pole and the first magnetic layer, a second non-magnetic layer provided between the first magnetic layer and the second magnetic layer, a third non-magnetic layer provided between the second magnetic layer and the third magnetic layer, a fourth non-magnetic layer provided between the third magnetic layer and the fourth magnetic layer, a fifth non-magnetic layer provided between the fourth magnetic layer and the fifth magnetic layer, a sixth non-magnetic layer provided between the fifth magnetic layer and the second magnetic pole. The fifth magnetic layer includes a first element and at least one of Fe, Co or Ni. The first element includes at least one selected from the group consisting of Cr, V, Mn, Ti, N and Sc. The fifth non-magnetic layer includes at least one selected from the group consisting of Ru, Ir, Ta, Rh, Pd, Pt and W. The sixth non-magnetic layer includes at least one selected from the group consisting of Cu, Au, Cr, Al, V and Ag.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic head according to a first embodiment.

Figure 2:
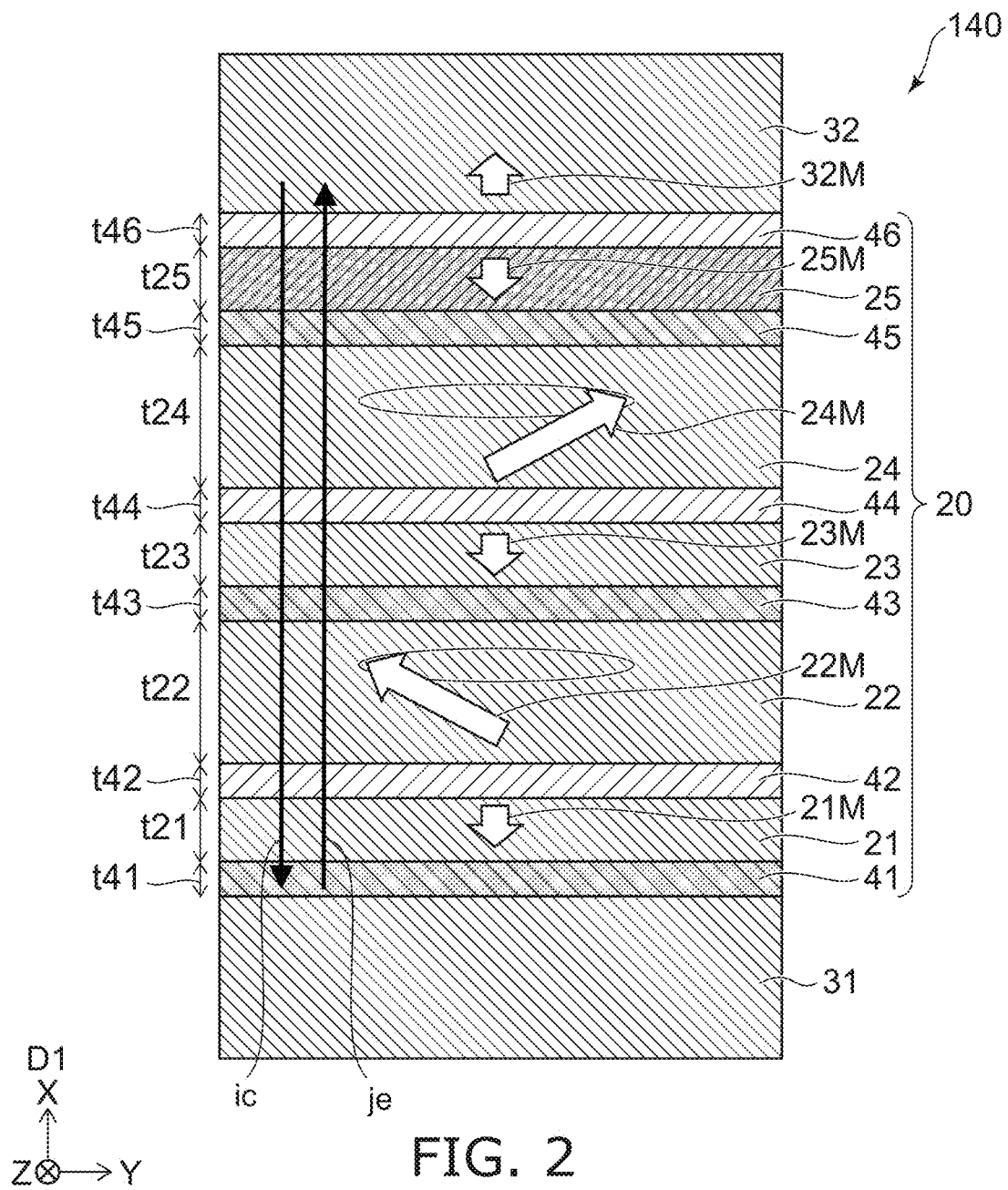
FIG. 2 is a schematic plan view illustrating the magnetic head according to the first embodiment.

FIG. 2 is a schematic plan view illustrating the magnetic head according to the first embodiment.

Figure 3:
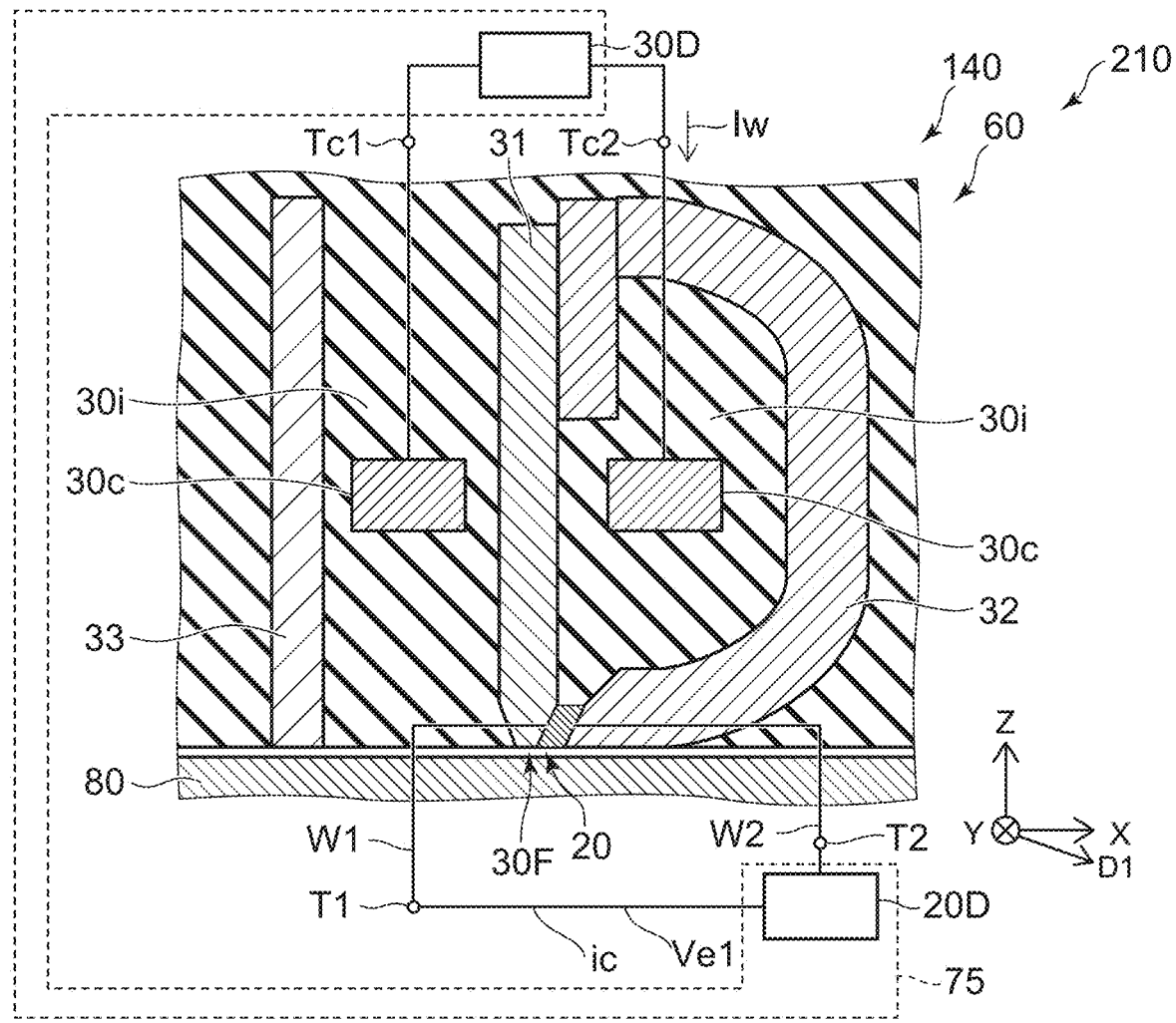
FIG. 3 is a schematic cross-sectional view illustrating the magnetic recording device including the magnetic head according to the first embodiment.

FIG. 3 is a schematic cross-sectional view illustrating the magnetic recording device including the magnetic head according to the first embodiment.

As shown in FIG. 3, a magnetic recording device 210 according to the embodiment includes a magnetic head 140 and a controller 75. The magnetic recording device 210 may include a magnetic recording medium 80. At least a recording operation is performed in the magnetic recording device 210. In the recording operation, information is recorded on the magnetic recording medium 80 using the magnetic head 140.

The magnetic head 140 includes a first magnetic pole 31, a second magnetic pole 32 and a magnetic element 20. The magnetic head 140 may include coil 30c. The first magnetic pole 31, the second magnetic pole 32, the magnetic element 20 and the coil 30c are included in the recording section 60. As will be described below, the magnetic head 140 may include a reproducing section. The magnetic element 20 is provided between the first magnetic pole 31 and the second magnetic pole 32.

For example, the first magnetic pole 31 and the second magnetic pole 32 form a magnetic circuit. The first magnetic pole 31 is, for example, a main magnetic pole. The second magnetic pole 32 is, for example, a trailing shield. The first magnetic pole 31 may be the trailing shield and the second magnetic pole 32 may be the main pole.

A direction from the magnetic recording medium 80 to the magnetic head 140 is defined as a Z-axis direction. One direction perpendicular to the Z-axis direction is defined as an X-axis direction. A direction perpendicular to the Z-axis direction and the X-axis direction is defined as a Y-axis direction. The Z-axis direction corresponds to, for example, the height direction. The X-axis direction corresponds to, for example, the down-track direction. The Y-axis direction corresponds to, for example, the cross-track direction. The magnetic recording medium 80 and the magnetic head 140 move relatively along the down-track direction. A recording magnetic field generated by a magnetic head 140 is applied to a desired position on the magnetic recording medium 80. Magnetization at a desired position of the magnetic recording medium 80 is controlled in a direction according to the recording magnetic field. Thus, information is recorded on the magnetic recording medium 80.

A direction from the first magnetic pole 31 to the second magnetic pole 32 is defined as a first direction D1. The first direction D1 is substantially along the X-axis direction. In the embodiments, the first direction D1 may be inclined with respect to the X-axis direction. The angle of inclination is, for example, more than 0 degrees and not more than 30 degrees.

In this example, a portion of coil 30c is provided between the first magnetic pole 31 and the second magnetic pole 32. In this example, a shield 33 is provided. The first magnetic pole 31 is provided between the shield 33 and the second magnetic pole 32 in the X-axis direction. Another portion of coil 30c is provided between the shield 33 and the first magnetic pole 31. An insulating portion 30i is provided between these multiple elements. The shield 33 is, for example, a leading shield. The magnetic head 140 may also include side shields (not shown).

As shown in FIG. 3, the first magnetic pole 31 includes a medium facing surface 30F. The medium facing surface 30F is, for example, an ABS (Air Bearing Surface). The medium facing surface 30F faces the magnetic recording medium 80, for example. The medium facing surface 30F extends, for example, along the X-Y plane.

As shown in FIG. 3, the controller 75 includes a recording circuit 30D and an element circuit 20D. A recording current Iw is supplied from the recording circuit 30D to the coil 30c. For example, a first coil terminal Tc1 and a second coil terminal Tc2 are provided on the coil 30c. The recording current Iw is supplied to the coil 30c via these coil terminals. The recording magnetic field corresponding to the recording current Iw is applied to the magnetic recording medium 80 from the first magnetic pole 31.

As shown in FIG. 3, the element circuit 20D is electrically connected to the magnetic element 20. In this example, the magnetic element 20 is electrically connected to the first magnetic pole 31 and the second magnetic pole 32. In the magnetic head 140, a first terminal T1 and a second terminal T2 are provided. The first terminal T1 is electrically connected to one end of the magnetic element 20 via the first wiring W1 and the first magnetic pole 31. The second terminal T2 is electrically connected to the other end of the magnetic element 20 via the second wiring W2 and the second magnetic pole 32. For example, an element current ic is supplied to the magnetic element 20 from the element circuit 20D. The element current ic is direct current, for example.

The element circuit 20D applies an element voltage Ve1 between the first terminal T1 and the second terminal T2. The element current ic based on the element voltage Ve1 flows through the magnetic element 20.

For example, by the element current ic equal to or higher than a threshold value flowing through the magnetic element 20, oscillation occurs in a magnetic layer included in the magnetic element 20. The magnetic element 20 functions, for example, as an STO (Spin-Torque Oscillator). An alternating magnetic field (for example, a high-frequency magnetic field) is generated from the magnetic element 20 along with the oscillation. An alternating magnetic field generated by the magnetic element 20 is applied to the magnetic recording medium 80 to assist recording on the magnetic recording medium 80. For example, MAMR (Microwave Assisted Magnetic Recording) can be performed.

As described above, the controller 75 is configured to supply the recording current Iw to the coil 30c and supply the element current ic to the magnetic element 20.

FIG. 2 corresponds to a plan view of the medium facing surface 30F viewed from the magnetic recording medium 80.

As shown in FIGS. 1 and 2, in the magnetic head 140, the magnetic element 20 includes a first magnetic layer 21, a second magnetic layer 22, a third magnetic layer 23, a fourth magnetic layer 24, a fifth magnetic layer 25, a first non-magnetic layer 41, a second non-magnetic layer 42, a third non-magnetic layer 43, a fourth non-magnetic layer 44, a fifth non-magnetic layer 45 and a sixth non-magnetic layer 46.

The second magnetic layer 22 is provided between the first magnetic layer 21 and the second magnetic pole 32. The third magnetic layer 23 is provided between the second magnetic layer 22 and the second magnetic pole 32. The fourth magnetic layer 24 is provided between the third magnetic layer 23 and the fifth magnetic layer 25. The fifth magnetic layer 25 is provided between the fourth magnetic layer 24 and the second magnetic pole 32.

The first non-magnetic layer 41 is provided between the first magnetic pole 31 and the first magnetic layer 21. The second non-magnetic layer 42 is provided between the first magnetic layer 21 and the second magnetic layer 22. The third non-magnetic layer 43 is provided between the second magnetic layer 22 and the third magnetic layer 23. The fourth non-magnetic layer 44 is provided between the third magnetic layer 23 and the fourth magnetic layer 24. The fifth non-magnetic layer 45 is provided between the fourth magnetic layer 24 and the fifth magnetic layer 25. The sixth non-magnetic layer 46 is provided between the fifth magnetic layer 25 and the second magnetic pole 32.

In the embodiment, the fifth magnetic layer 25 includes at least one of Fe, Co or Ni and a first element including at least one selected from the group consisting of Cr, V, Mn, Ti, N and Sc. The fifth non-magnetic layer 45 includes at least one selected from the group consisting of Ru, Ir, Ta, Rh, Pd, Pt and W. The sixth non-magnetic layer 46 includes at least one selected from the group consisting of Cu, Au, Cr, Al, V and Ag.

The fifth magnetic layer 25 has, for example, negative polarization. On the other hand, the first magnetic layer 21, the second magnetic layer 22, the third magnetic layer 23 and the fourth magnetic layer 24 include at least one of Fe, Co or Ni. The first magnetic layer 21, the second magnetic layer 22, the third magnetic layer 23, and the fourth magnetic layer 24 do not include the first element. Alternatively, a concentration of the first element in the first magnetic layer 21, the second magnetic layer 22, the third magnetic layer 23 and the fourth magnetic layer 24 is lower than a concentration of the first element in the fifth magnetic layer 25. For example, the first magnetic layer 21, the second magnetic layer 22, the third magnetic layer 23, and the fourth magnetic layer 24 have positive polarization.

As described above, in the embodiment, the fifth non-magnetic layer 45 includes at least one selected from the group consisting of Ru, Ir, Ta, Rh, Pd, Pt and W. Thereby, for example, spin transfer torque from the fourth magnetic layer 24 is suppressed from acting on the fifth magnetic layer 25. Thereby, the magnetization 25M of the fifth magnetic layer 25 is stabilized. By stabilizing the magnetization 25M of the fifth magnetic layer 25, the magnetization 24M of the fourth magnetic layer 24 efficiently oscillates. A strong oscillation is obtained. Thereby, it becomes possible to provide a magnetic head capable of improving the recording density.

The magnetization of the magnetic pole (e.g., the second magnetic pole 32) is not always stable and may oscillate. Even when the magnetization of the second magnetic pole 32 is unstable, it is preferable that stable oscillation is obtained in the magnetic element 20. In the magnetic head 140 according to the embodiment, the combination of the fifth non-magnetic layer 45 and the fifth magnetic layer 25 is applied in the magnetic element 20. Thereby, the magnetization 25M of the fifth magnetic layer 25 is stabilized even when the magnetization of the second magnetic pole 32 is unstable. Efficient oscillation is obtained in the fourth magnetic layer 24 due to the fifth magnetic layer 25 being stable. Examples of simulation results of the characteristics of the magnetic element will be described below.

Figure 4:
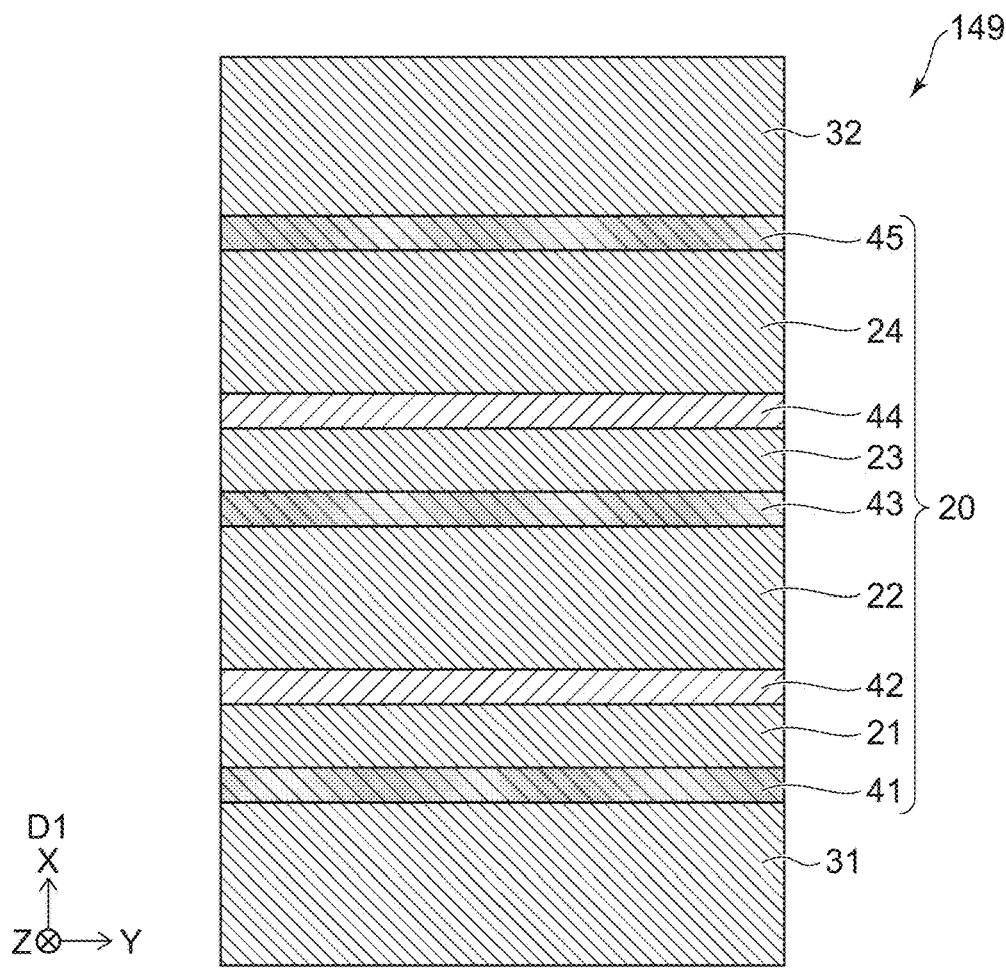
FIG. 4 is a schematic plan view illustrating a magnetic head of a reference example.

FIG. 4 is a schematic plan view illustrating a magnetic head of a reference example.

FIG. 4 shows a magnetic head 149 of a reference example. In the magnetic head 149, the fifth magnetic layer 25 and the sixth non-magnetic layer 46 are not provided.

Figure 5:
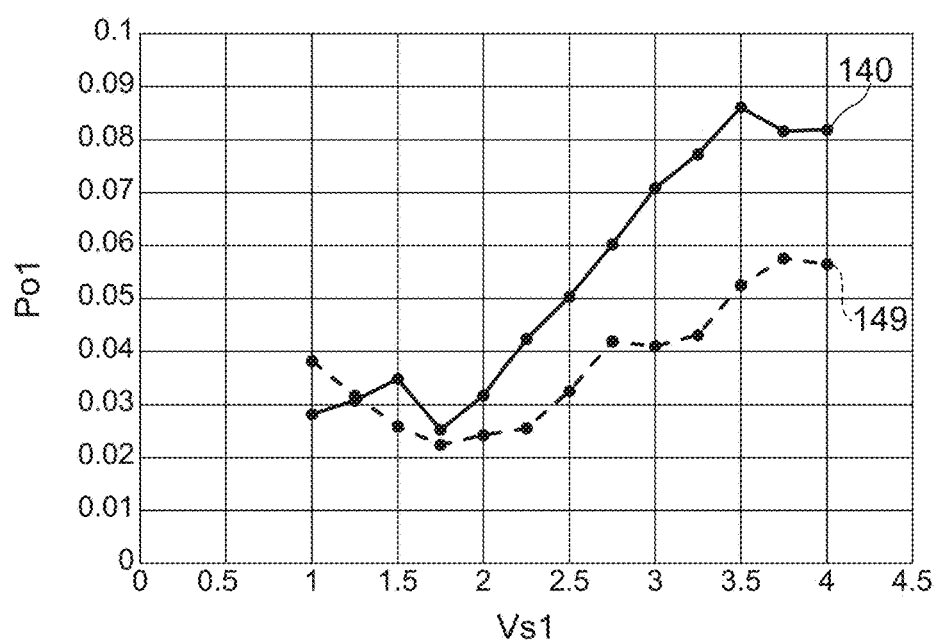
FIG. 5 is a graph illustrating characteristics of the magnetic heads.

FIG. 5 is a graph illustrating characteristics of the magnetic heads.

FIG. 5 illustrates simulation results of the characteristics of the magnetic heads 140 and 149. In the simulation model, the magnetization of the second magnetic pole 32 is movable. The horizontal axis of FIG. 5 is the applied voltage Vs1 being normalized. The applied voltage Vs1 is applied between one end of the magnetic element 20 and the other end. The vertical axis is an oscillation parameter Po1. The higher the oscillation parameter Po1, the higher the intensity of stable oscillation.

As shown in FIG. 5, in the region where the applied voltage Vs1 is high, the oscillation parameter Po1 of the magnetic head 140 is higher than the oscillation parameter Po1 of the magnetic head 149 of the reference example. Similar tendencies are obtained when the thicknesses of the magnetic layers is changed in the configuration of the magnetic head 149. In the configuration of the magnetic head 140, high intensity oscillation is obtained. According to the embodiments, it is possible to provide a magnetic head capable of improving the recording density.

In the magnetic head 140, the fifth non-magnetic layer 45 contacts the fifth magnetic layer 25. The sixth non-magnetic layer 46 contacts the fifth magnetic layer 25 and the second magnetic pole 32.

In the magnetic head 140, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, Al, V and Ag.

As shown in FIG. 2, a thickness of the first magnetic layer 21 in the first direction D1 is defined as a first thickness t21. The first direction D1 is a direction from the first magnetic pole 31 to the second magnetic pole 32. A thickness of the second magnetic layer 22 in the first direction D1 is defined as a second thickness t22. A thickness of the third magnetic layer 23 in the first direction D1 is defined as a third thickness t23. A thickness of the fourth magnetic layer 24 in the first direction D1 is defined as a fourth thickness t24. A thickness of the fifth magnetic layer 25 in the first direction D1 is defined as a fifth thickness t25.

In the magnetic head 140, the second thickness t22 is thicker than the first thickness t21. The third thickness t23 is thicker than the first thickness t21. The fourth thickness t24 is thicker than the third thickness t23. The fifth thickness t25 is thinner than the fourth thickness t24.

In the magnetic head 140, for example, the second magnetic layer 22 and the fourth magnetic layer 24 function as oscillation layers. The first magnetic layer 21, the third magnetic layer 23, and the fifth magnetic layer 25 function, for example, as spin injection layers. The magnetization 22M of the second magnetic layer 22 oscillates. The magnetization 24M of the fourth magnetic layer 24 oscillates. For example, an orientation of the component of the magnetization 25M of the fifth magnetic layer 25 along the first direction D1 is opposite to an orientation of the component of the magnetization 32M of the second magnetic pole 32 along the first direction D1. An orientation of the component of the magnetization 23M of the third magnetic layer 23 along the first direction D1 is the same as the orientation of the component of the magnetization 25M along the first direction D1. An orientation of the component of the magnetization 21M of the first magnetic layer 21 along the first direction D1 is the same as the orientation of the component of the magnetization 25M along the first direction D1.

As shown in FIG. 2, when the magnetic head 140 is in operation, an element current ic equal to or higher than the threshold value is supplied to the magnetic element 20. The element current ic flows in the direction from the second magnetic pole 32 to the first magnetic pole 31, for example.

An electron flow je corresponding to the device current ic flows in the direction from the first magnetic pole 31 to the second magnetic pole 32. The element current ic flows in the direction from the sixth non-magnetic layer 46 to the first non-magnetic layer 41. An element voltage Ve1 is applied to the magnetic element 20 in the operation. The potential of the first magnetic pole 31 is lower than the potential of the second magnetic pole 32 when the element voltage Ve1 is applied.

Figure 6:
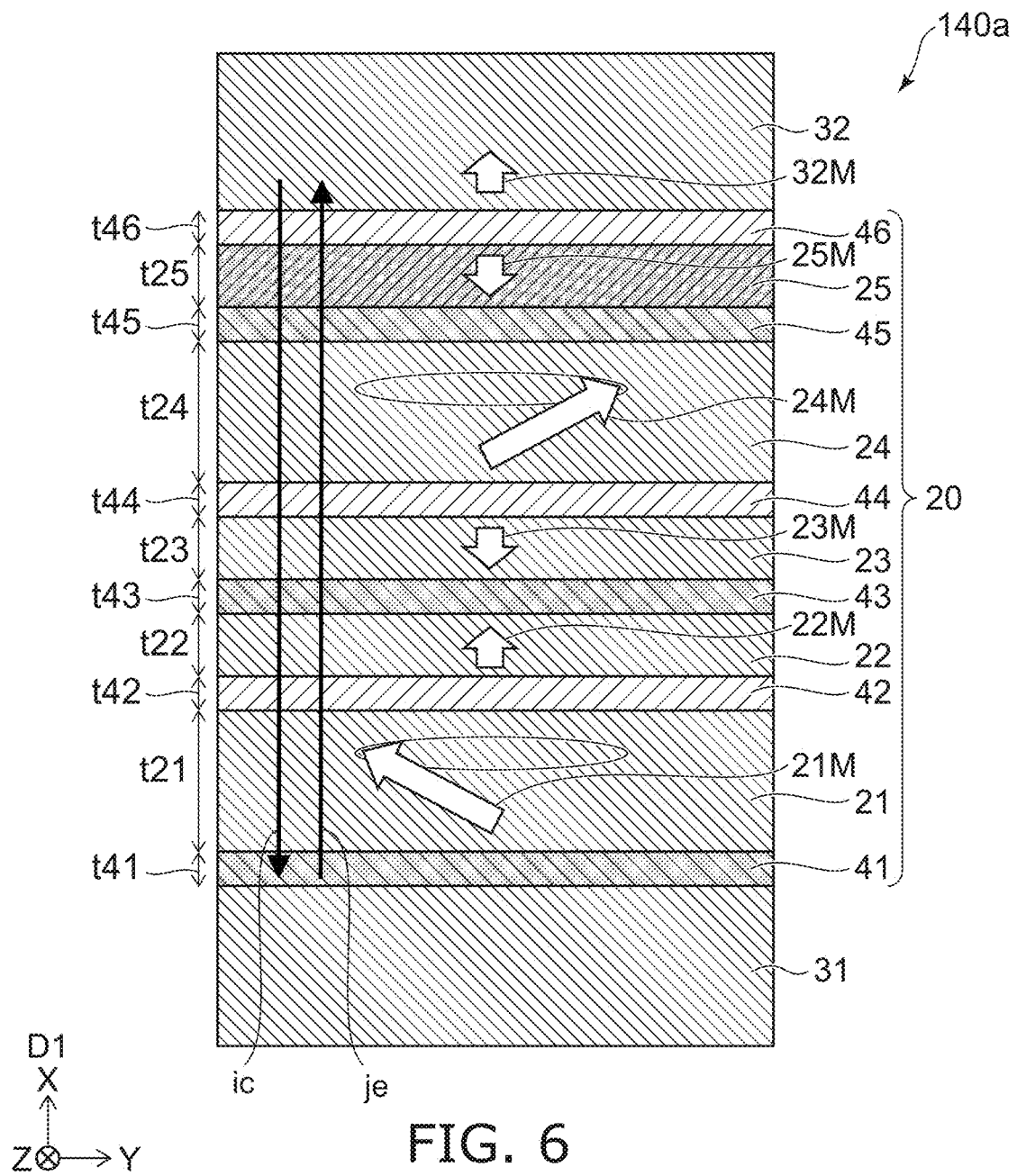
FIG. 6 is a schematic plan view illustrating a magnetic head according to the first embodiment.

FIG. 6 is a schematic plan view illustrating a magnetic head according to the first embodiment.

As shown in FIG. 6, in a magnetic head 140a according to the embodiment, the relationship between the first thickness t21 and the second thickness t22 is different from the relation in the magnetic head 140. Other configurations of the magnetic head 140a are the same as the configurations of the magnetic head 140.

In the magnetic head 140a, the second thickness t22 is thinner than the first thickness t21. The third thickness t23 is thinner than the first thickness t21. The fourth thickness t24 is thicker than the third thickness t23. The fifth thickness t25 is thinner than the fourth thickness t24.

In the magnetic head 140a, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, Al, V and Ag. High-intensity oscillation is also obtained in the magnetic head 140a.

Figure 7:
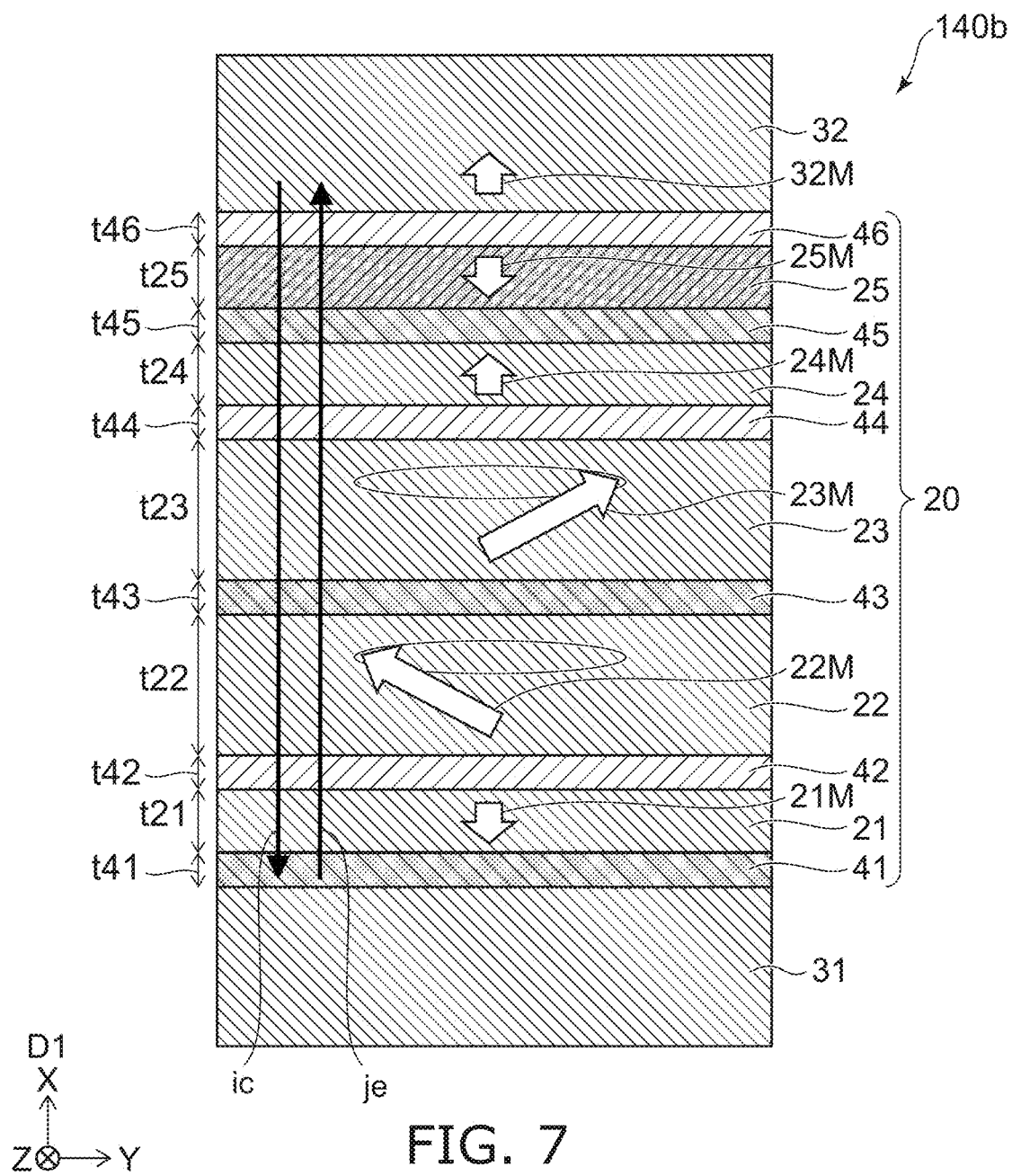
FIG. 7 is a schematic plan view illustrating a magnetic head according to the first embodiment.

FIG. 7 is a schematic plan view illustrating a magnetic head according to the first embodiment.

As shown in FIG. 7, in a magnetic head 140b according to the embodiment, the configurations of the third magnetic layer 23 and the fourth magnetic layer 24 are different from the configurations of the magnetic head 140. Other configurations of the magnetic head 140b may be the same as the configuration of the magnetic head 140.

In the magnetic head 140b, the second thickness t22 is thicker than the first thickness t21. The third thickness t23 is thicker than the first thickness t21. The fourth thickness t24 is thinner than the third thickness t23. The fifth thickness t25 is thinner than the third thickness t23.

In the magnetic head 140b, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, Al, V and Ag. A high-intensity oscillation is also obtained in the magnetic head 140b.

Figure 8:
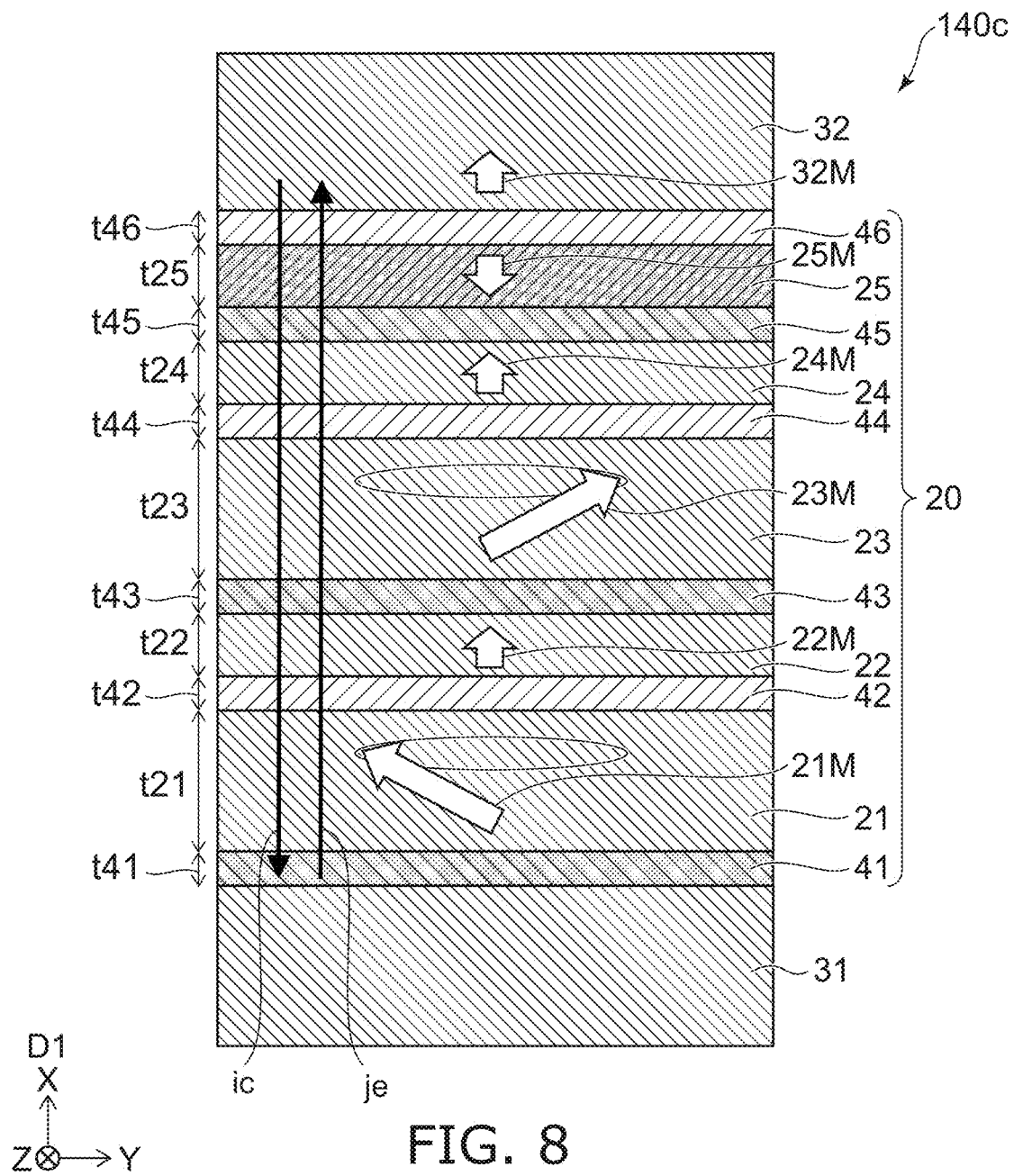
FIG. 8 is a schematic plan view illustrating a magnetic head according to the first embodiment.

FIG. 8 is a schematic plan view illustrating a magnetic head according to the first embodiment.

As shown in FIG. 8, in the magnetic head 140c according to the embodiment, the configurations of the first magnetic layer 21, the second magnetic layer 22, the third magnetic layer 23, and the fourth magnetic layer 24 are different from the configurations of the magnetic head 140. Other configurations of the magnetic head 140a may be the same as the configurations of the magnetic head 140.

In the magnetic head 140c, the second thickness t22 is thinner than the first thickness t21. The third thickness t23 is thicker than the second thickness t22. The fourth thickness t24 is thinner than the third thickness t23. The fifth thickness t25 is thinner than the third thickness t23.

In the magnetic head 140c, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, Al, V and Ag. A high-intensity oscillation is also obtained in the magnetic head 140b.

In the magnetic heads 140, 140a, 140b and 140c, the first non-magnetic layer 41 contacts the first magnetic pole 31 and the first magnetic layer 21. The second non-magnetic layer 42 contacts the first magnetic layer 21 and the second magnetic layer 22. The third non-magnetic layer 43 is contacts the second magnetic layer 22 and the third magnetic layer 23. The fourth non-magnetic layer 44 contacts with the third magnetic layer 23 and the fourth magnetic layer 24. The fifth non-magnetic layer 45 contacts the fourth magnetic layer 24 and the fifth magnetic layer 25. The sixth non-magnetic layer 46 contacts the fifth magnetic layer 25 and the second magnetic pole 32.

Figure 9:
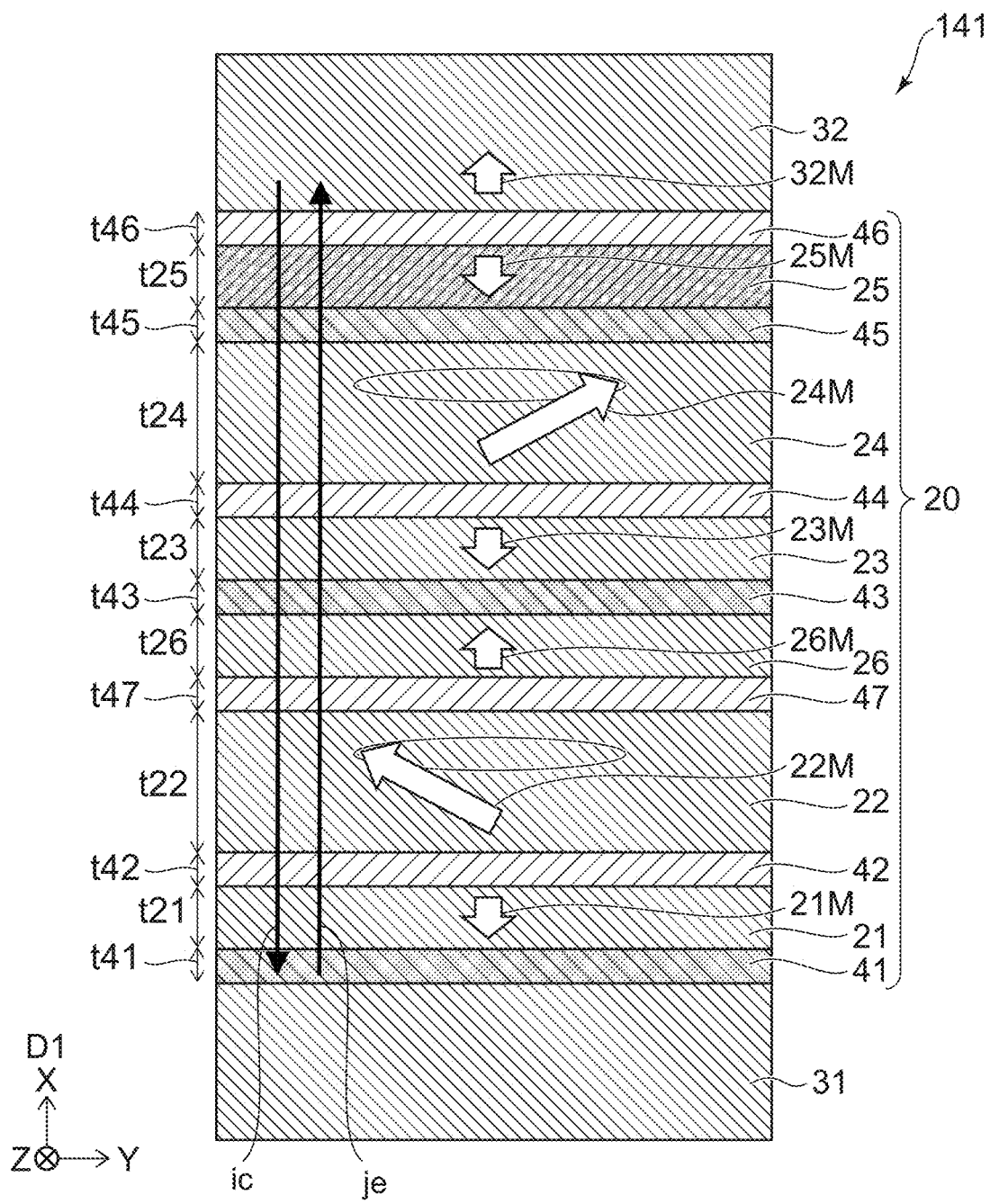
FIG. 9 is a schematic plan view illustrating a magnetic head according to the first embodiment.

FIG. 9 is a schematic plan view illustrating a magnetic head according to the first embodiment.

As shown in FIG. 9, in a magnetic head 141 according to the embodiment, the magnetic element 20 further includes a sixth magnetic layer 26 with the magnetization 26M and a seventh non-magnetic layer 47. Other configurations of the magnetic head 141 may be the same as the configurations of the magnetic head 140.

In the magnetic head 141, the sixth magnetic layer 26 is provided between the second magnetic layer 22 and the third magnetic layer 23. The seventh non-magnetic layer 47 is provided between the second magnetic layer 22 and the sixth magnetic layer 26. A thickness of the sixth magnetic layer 26 in the first direction D1 is defined as a sixth thickness t26.

In the magnetic head 141, the second thickness t22 is thicker than the first thickness t21. The sixth thickness t26 is thinner than the second thickness t22. The third thickness t23 is thinner than the second thickness t22. The fourth thickness t24 is thicker than the third thickness t23. The fifth thickness t25 is thinner than the fourth thickness t24.

In the magnetic head 141, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The seventh non-magnetic layer 47 includes at least one selected from the group consisting of Cu, Au, Cr, Al, V and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, Al, V and Ag. A high-intensity oscillation is also obtained in the magnetic head 140b.

Figure 10:
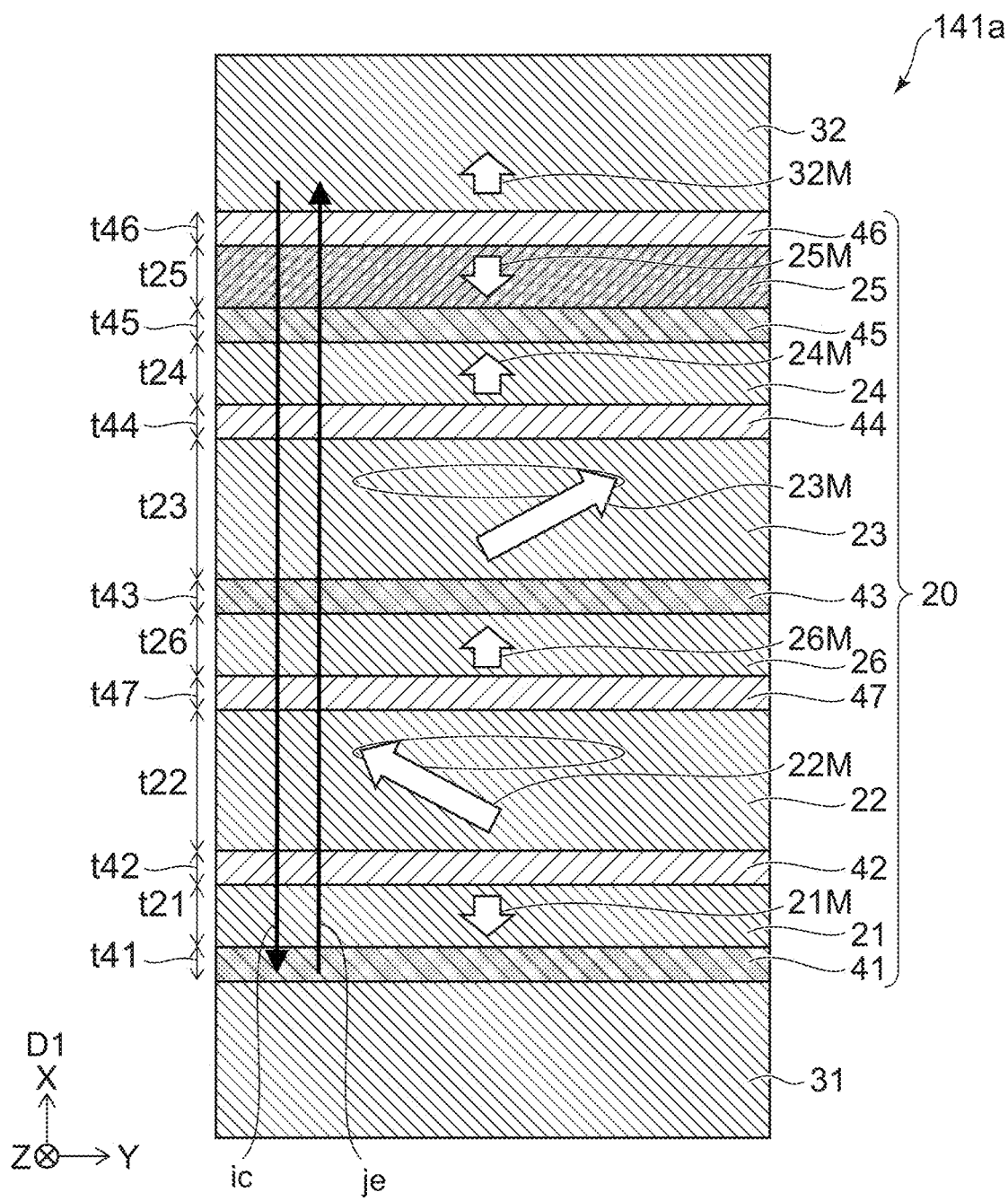
FIG. 10 is a schematic plan view illustrating a magnetic head according to the first embodiment.

FIG. 10 is a schematic plan view illustrating a magnetic head according to the first embodiment.

As shown in FIG. 10, in a magnetic head 141a according to the embodiment, the configurations of the third magnetic layer 23 and the fourth magnetic layer 24 are different from the configurations of the magnetic head 141. Other configurations of the magnetic head 141a may be the same as the configurations of the magnetic head 141.

In the magnetic head 141a, the second thickness t22 is thicker than the first thickness t21. The sixth thickness t26 is thinner than the second thickness t22. The third thickness t23 is thicker than the first thickness t21. The fourth thickness t24 is thinner than the third thickness t23. The fifth thickness t25 is thinner than the third thickness t23.

In the magnetic head 141a, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The seventh non-magnetic layer includes at least one selected from the group consisting of Cu, Au, Cr, Al, V and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, Al, V and Ag. A high-intensity oscillation is also obtained in the magnetic head 141a.

Figure 11:
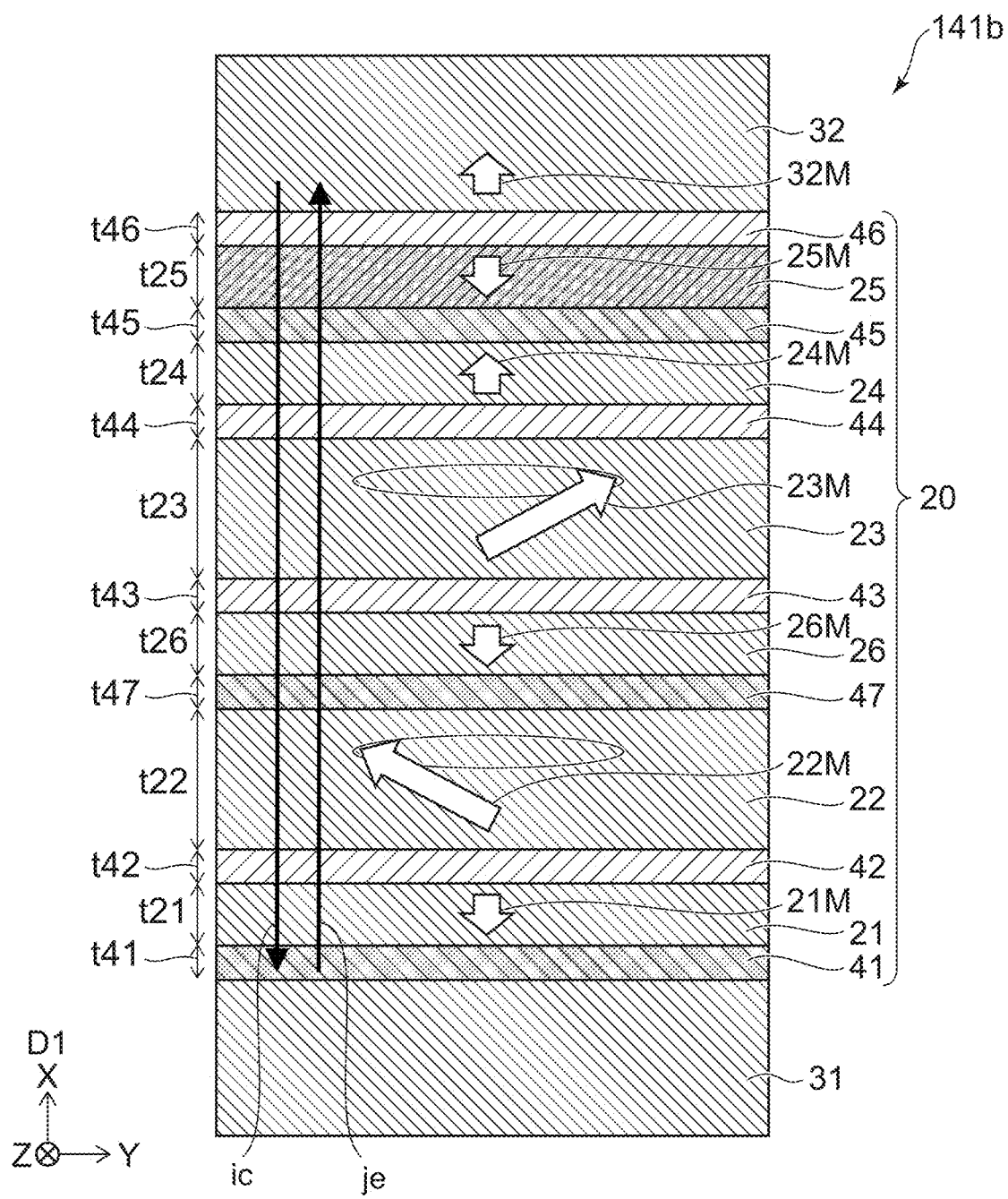
FIG. 11 is a schematic plan view illustrating a magnetic head according to the first embodiment.

FIG. 11 is a schematic plan view illustrating a magnetic head according to the first embodiment.

As shown in FIG. 11, in a magnetic head 141b according to the embodiment, the configurations of the third non-magnetic layer 43 and the seventh non-magnetic layer 47 are different from the configurations of the magnetic head 141a. Other configuration of the magnetic head 141b may be the same as the configurations of the magnetic head 141a.

In the magnetic head 141b, the second thickness t22 is thicker than the first thickness t21. The sixth thickness t26 is thinner than the second thickness t22. The third thickness t23 is thicker than the first thickness t21. The fourth thickness t24 is thinner than the third thickness t23. The fifth thickness t25 is thinner than the third thickness t23.

In the magnetic head 141b, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The seventh non-magnetic layer 47 includes at least one selected from the group consisting of Ru, Ir, Ta, Rh, Pd, Pt and W. The third non-magnetic layer 43 includes at least one selected from the group consisting of Cu, Au, Cr, Al, V and Ag. The fourth non-magnetic layer 44 includes at least one selected from the group consisting of Cu, Au, Cr, Al, V and Ag. A high-intensity oscillation is also obtained in the magnetic head 141b.

Figure 12:
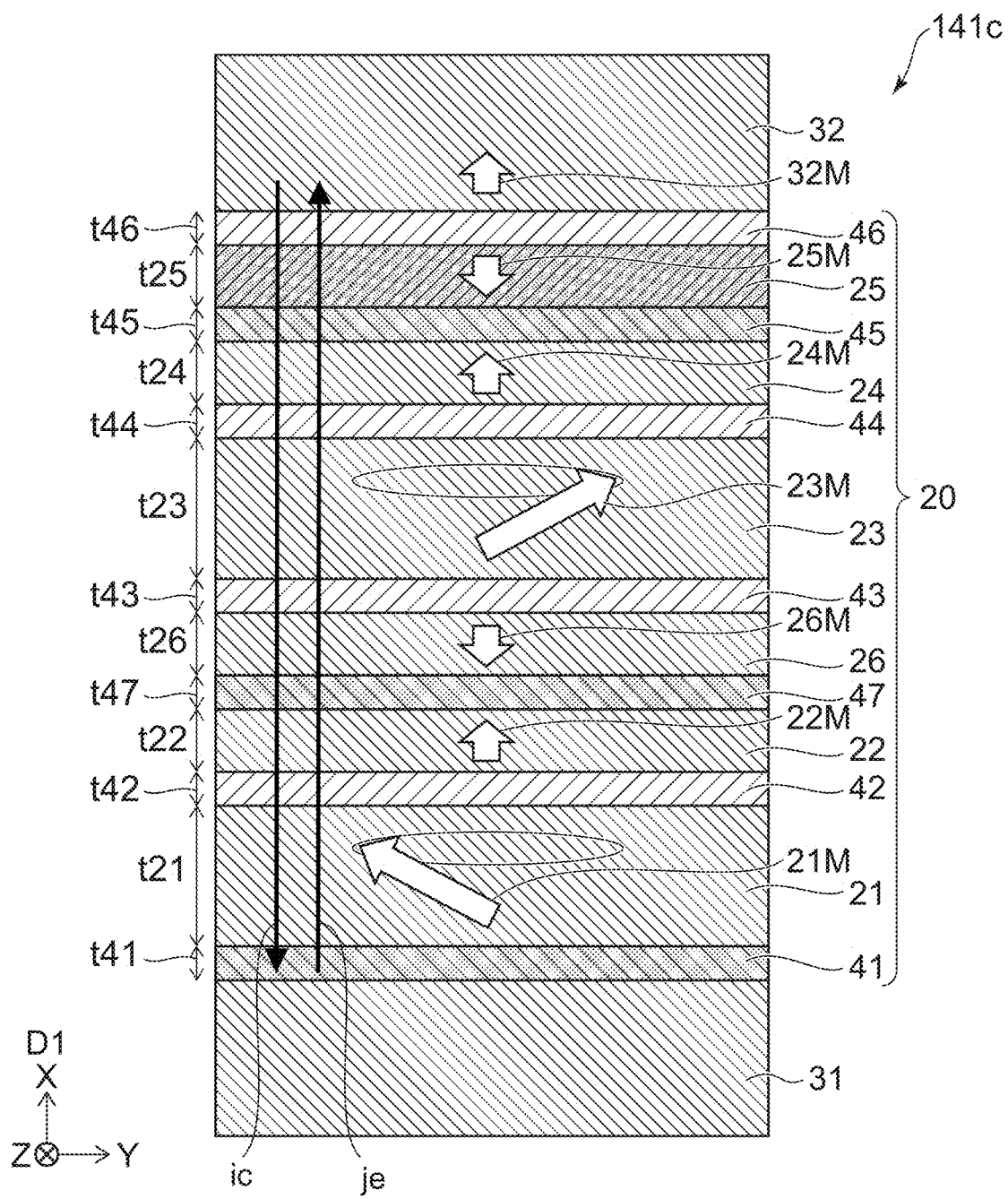
FIG. 12 is a schematic plan view illustrating a magnetic head according to the first embodiment.

FIG. 12 is a schematic plan view illustrating a magnetic head according to the first embodiment.

As shown in FIG. 12, in a magnetic head 141c according to the embodiment, the configurations of the first magnetic layer 21 and the second magnetic layer 22 are different from the configurations of the magnetic head 141b. Other configurations of the magnetic head 141c may be the same as the configurations of the magnetic head 141b.

In the magnetic head 141c, the second thickness t22 is thinner than the first thickness t21. The sixth thickness t26 is thinner than the first thickness t21. The third thickness t23 is thicker than the second thickness t22. The fourth thickness t24 is thinner than the third thickness t23. The fifth thickness t25 is thinner than the third thickness t23.

In the magnetic head 141c, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The seventh non-magnetic layer 47 includes at least one selected from the group consisting of Ru, Ir, Ta, Rh, Pd, Pt and W. The third non-magnetic layer 43 includes at least one selected from the group consisting of Cu, Au, Cr, Al, V and Ag. The fourth non-magnetic layer 44 includes at least one selected from the group consisting of Cu, Au, Cr, Al, V and Ag. A high-intensity oscillation is also obtained in the magnetic head 141c.

Figure 13:
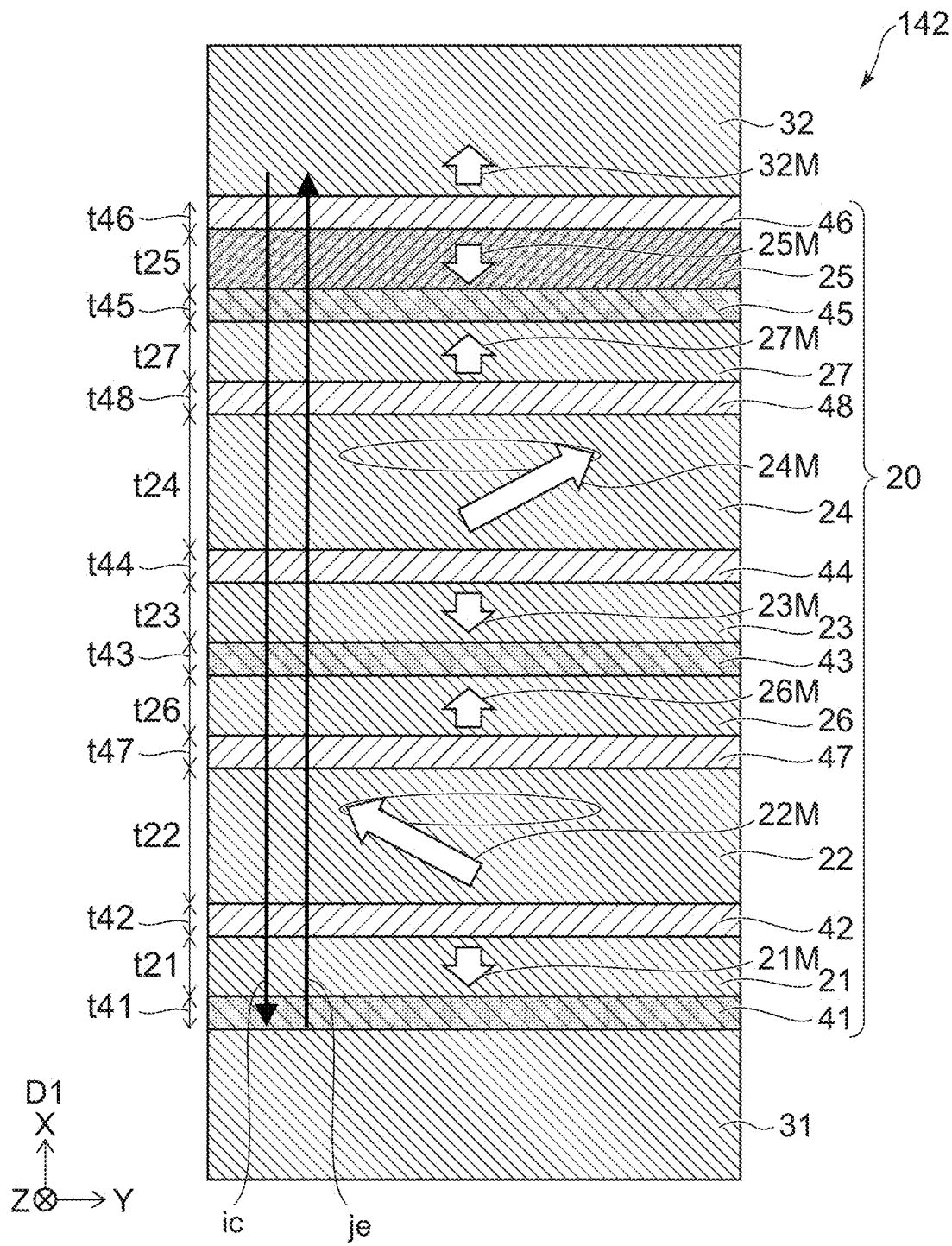
FIG. 13 is a schematic plan view illustrating a magnetic head according to the first embodiment.

FIG. 13 is a schematic plan view illustrating a magnetic head according to the first embodiment.

As shown in FIG. 13, in a magnetic head 142 according to the embodiment, the magnetic element 20 includes a sixth magnetic layer 26, a seventh magnetic layer 27, a seventh non-magnetic layer 47 and an eighth non-magnetic layer. Other configurations of the magnetic head 142 may be the same as the configurations of the magnetic head 140.

In the magnetic head 142, the sixth magnetic layer 26 is provided between the second magnetic layer 22 and the third magnetic layer 23. The seventh non-magnetic layer 47 is provided between the second magnetic layer 22 and the sixth magnetic layer 26. The seventh magnetic layer 27 is provided between the fourth magnetic layer 24 and the fifth magnetic layer 25. The eighth non-magnetic layer 48 is provided between the fourth magnetic layer 24 and the seventh magnetic layer 27. A thickness of the seventh magnetic layer 27 in the first direction D1 is defined as a seventh thickness t27.

In the magnetic head 142, the second thickness t22 is thicker than the first thickness t21. The sixth thickness t26 is thinner than the second thickness t22. The third thickness t23 is thinner than the second thickness t22. The fourth thickness t24 is thicker than the third thickness t23. The seventh thickness t27 is thinner than the fourth thickness t24. The fifth thickness t25 is thinner than the fourth thickness t24.

In the magnetic head 142, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The seventh non-magnetic layer 47 includes at least one selected from the group consisting of Cu, Au, Cr, Al, V and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, Al, V and Ag. The eighth non-magnetic layer 48 includes at least one selected from the group consisting of Cu, Au, Cr, Al, V and Ag. A high-intensity oscillation can be obtained in the magnetic head 142 as well.

In the magnetic head 142, for example, the component of the magnetization 27M of the seventh magnetic layer 27 along the first direction D1 is opposite to the component of the magnetization 25M of the fifth magnetic layer 25 along the first direction D1.

In the embodiment, the first non-magnetic layer thickness t41 may be, for example, not less than 1 nm and not more than 10 nm. The second non-magnetic layer thickness t42 may be, for example, not less than 0.5 nm and not more than 6 nm. The third non-magnetic layer thickness t43 may be, for example, not less than 0.5 nm and not more than 10 nm. The fourth non-magnetic layer thickness t44 may be, for example, not less than 0.5 nm and not more than 6 nm. The fifth non-magnetic layer thickness t45 may be, for example, not less than 1 nm and not more than 10 nm. The sixth non-magnetic layer thickness t46 may be, for example, not less than 0.5 nm and not more than 6 nm. The seventh non-magnetic layer thickness t47 may be, for example, not less than 0.5 nm and not more than 10 nm. The eighth non-magnetic layer thickness t48 may be, for example, not less than 0.5 nm and not more than 6 nm or less.

In the operation, an element current ic greater than or equal to the threshold value is supplied to the magnetic element 20. The element voltage Ve1 is applied to the magnetic element 20 in the operation. The element current ic and the element voltage Ve1 are supplied by the element circuit 20D. For example, one end of the magnetic element 20 is electrically connected to the first magnetic pole 31. The other end of the magnetic element 20 is electrically connected to the second magnetic pole 32. The element circuit 20D is configured to apply the element voltage Ve1 between the first magnetic pole 31 and the second magnetic pole 32. The potential of the first magnetic pole 31 is lower than the potential of the second magnetic pole 32 when the element voltage Ve1 is applied.

FIGS. 14 to 22 are graphs illustrating characteristics of the magnetic heads according to the first embodiment.

These figures illustrate the differential electric resistance of the magnetic element 20 when a voltage Va1 applied to the magnetic element 20 is changed. The horizontal axis is the voltage Va1. The vertical axis is the differential electric resistance Rd1. The voltage Va1 may be a voltage between the first terminal T1 and the second terminal T2. For example, a voltage corresponding to the voltage Va1 is applied to the magnetic element 20. FIGS. 14 to 22 correspond to magnetic heads 140, 140a, 140b, 140c, 141, 141a, 141b, 141c, and 142.

Figure 14:
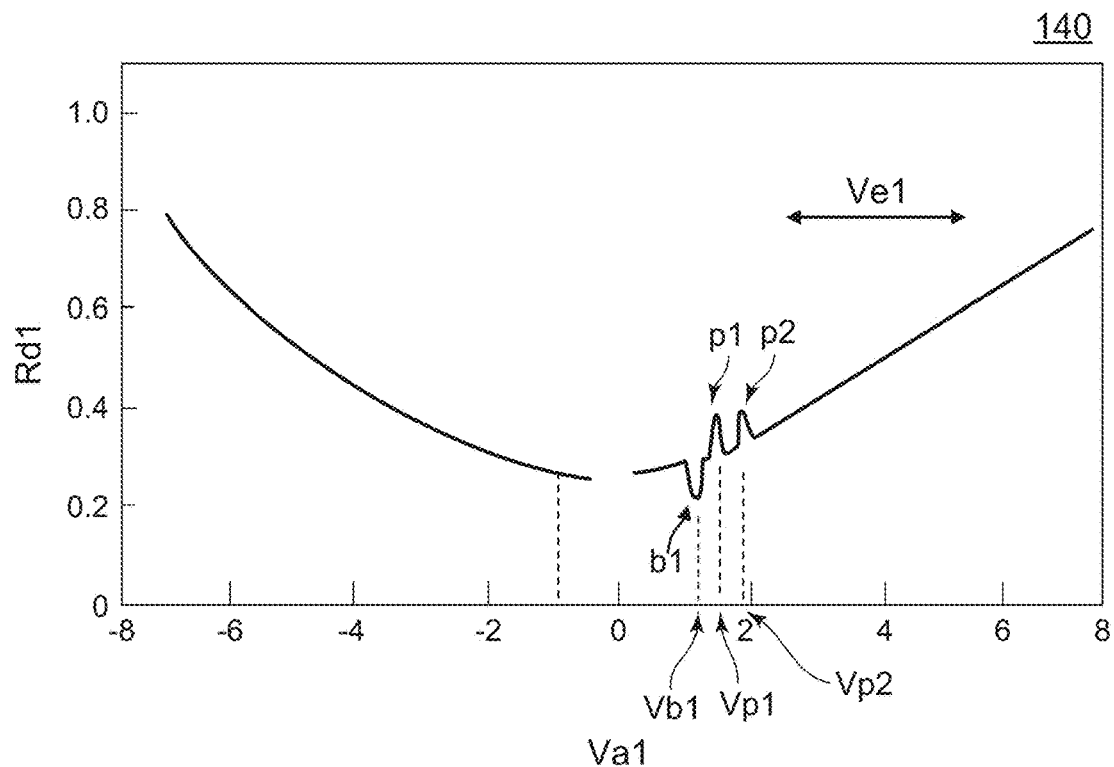
FIG. 14 is a graph illustrating characteristics of the magnetic head according to the first embodiment.

As shown in FIG. 14, in the magnetic head 140, the differential electrical resistance Rd1 includes a first positive bottom b1, a first positive peak p1 and a second positive peak p2. The first positive bottom b1 is, for example, a negative peak. The voltage Va1 corresponding to the first positive bottom b1 is a first positive bottom voltage Vb1. The voltage Va1 corresponding to the first positive peak p1 is a first positive peak voltage Vp1. The voltage Va1 corresponding to the second positive peak p2 is a second positive peak voltage Vp2. The first positive bottom voltage Vb1, the first positive peak voltage Vp1, the second positive peak voltage Vp2 and the element voltage Ve1 are positive. The potential of the first magnetic pole 31 is lower than the potential of the second magnetic pole 32 when the positive voltage Va1 is applied. The element voltage Ve1 is higher than the first positive bottom voltage Vb1, higher than the first positive peak voltage Vp1, and higher than the second positive peak voltage Vp2.

Thus, the differential electrical resistance Rd1 includes at least one peak and at least one bottom. In this example, the at least one peak is the first positive peak p1 and the second positive peak p2. The at least one bottom is the first positive bottom b1. It is considered that the peaks and bottoms correspond to discontinuous changes in electrical resistance accompanying reversal of magnetization of multiple magnetic layers included in the magnetic element 20.

The voltage Va1 corresponding to the at least one peak is a peak voltage (in this example, the first positive peak voltage Vp1 or the second positive peak voltage Vp2). The voltage Va1 corresponding to the at least one bottom is a bottom voltage (in this example, the first positive bottom voltage Vb1). The element voltage Ve1 is higher than the peak voltage and higher than the bottom voltage. Thereby, a stable and high-intensity oscillation can be obtained.

Figure 15:
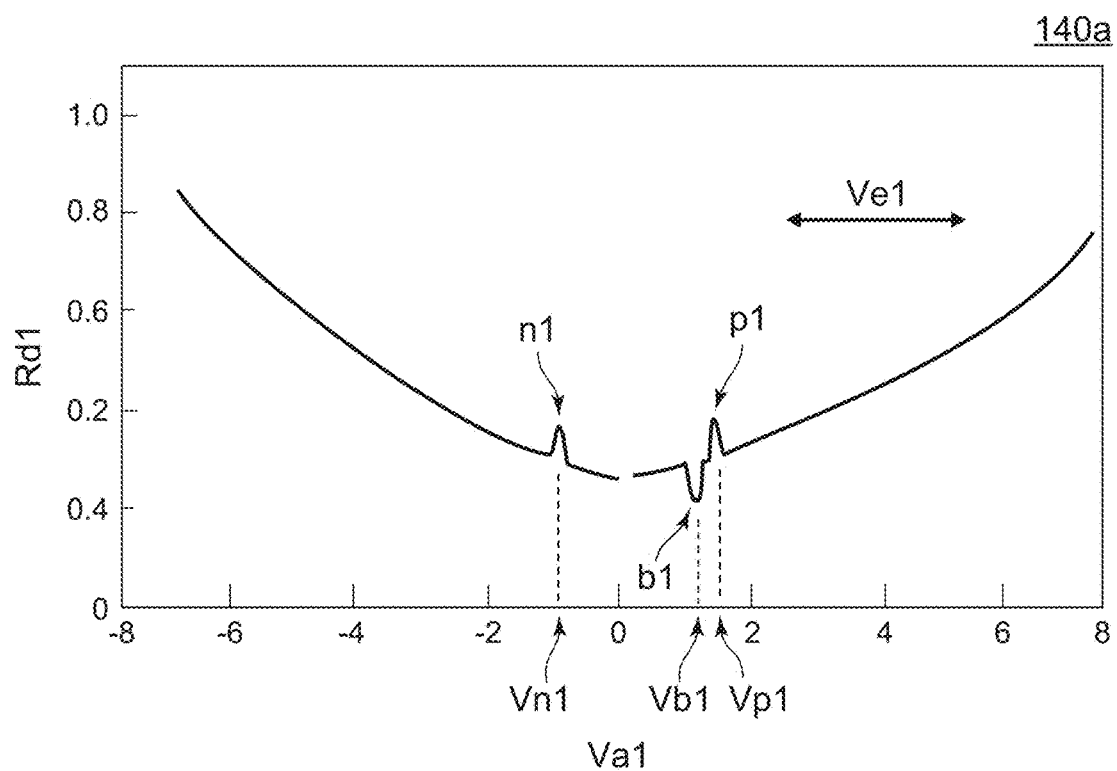
FIG. 15 is a graph illustrating characteristics of the magnetic head according to the first embodiment.

As shown in FIG. 15, in the magnetic head 140a, the differential electrical resistance Rd1 includes a first negative peak n1, the first positive bottom b1, and the first positive peak p1. The voltage Va1 corresponding to the first negative peak n1 is a first negative peak voltage Vn1. The first negative peak voltage Vn1 is negative. The potential of the first magnetic pole 31 is higher than the potential of the second magnetic pole 32 when the voltage Va1 being negative is applied. The element voltage Ve1 is higher than the peak voltage (first negative peak voltage Vn1 and first positive peak voltage Vp1) and higher than the bottom voltage (first positive bottom voltage Vb1). A stable and high-intensity oscillation can be obtained.

Figure 16:
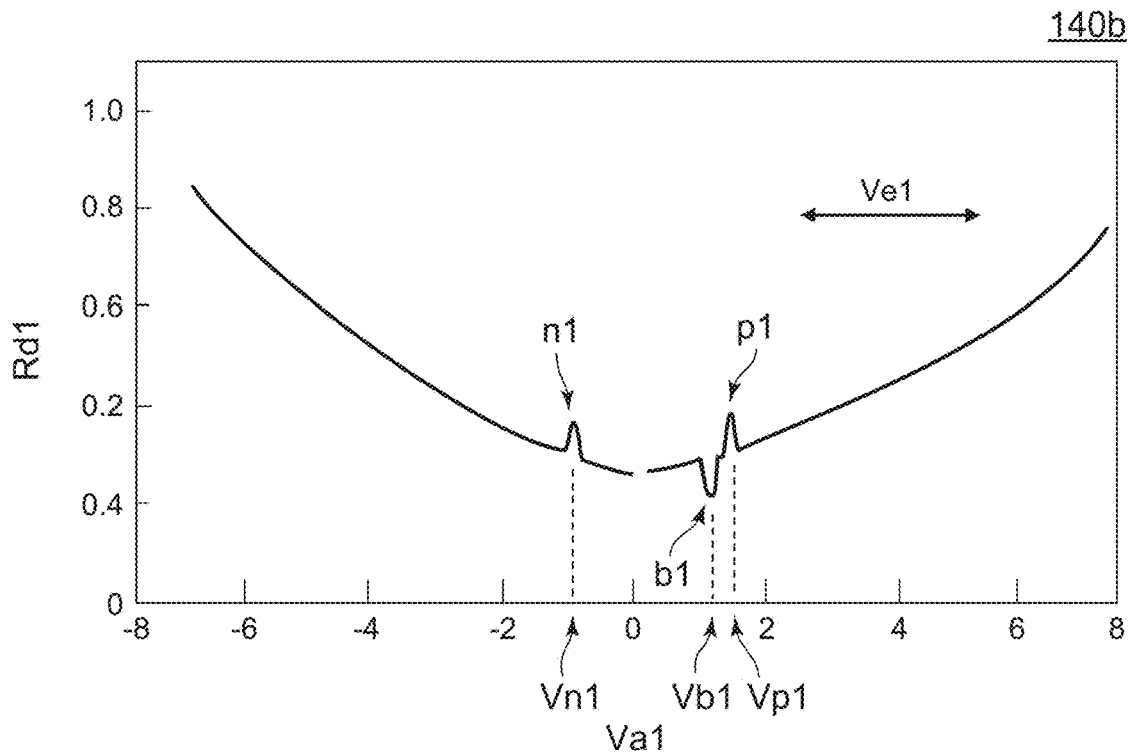
FIG. 16 is a graph illustrating characteristics of the magnetic head according to the first embodiment.

As shown in FIG. 16, in the magnetic head 140b, the differential electrical resistance Rd1 includes the first negative peak n1, the first positive bottom b1, and the first positive peak p1. The element voltage Ve1 is higher than the peak voltage (first negative peak voltage Vn1 and first positive peak voltage Vp1) and higher than the bottom voltage (first positive bottom voltage Vb1). A stable and high-intensity oscillation can be obtained.

Figure 17:
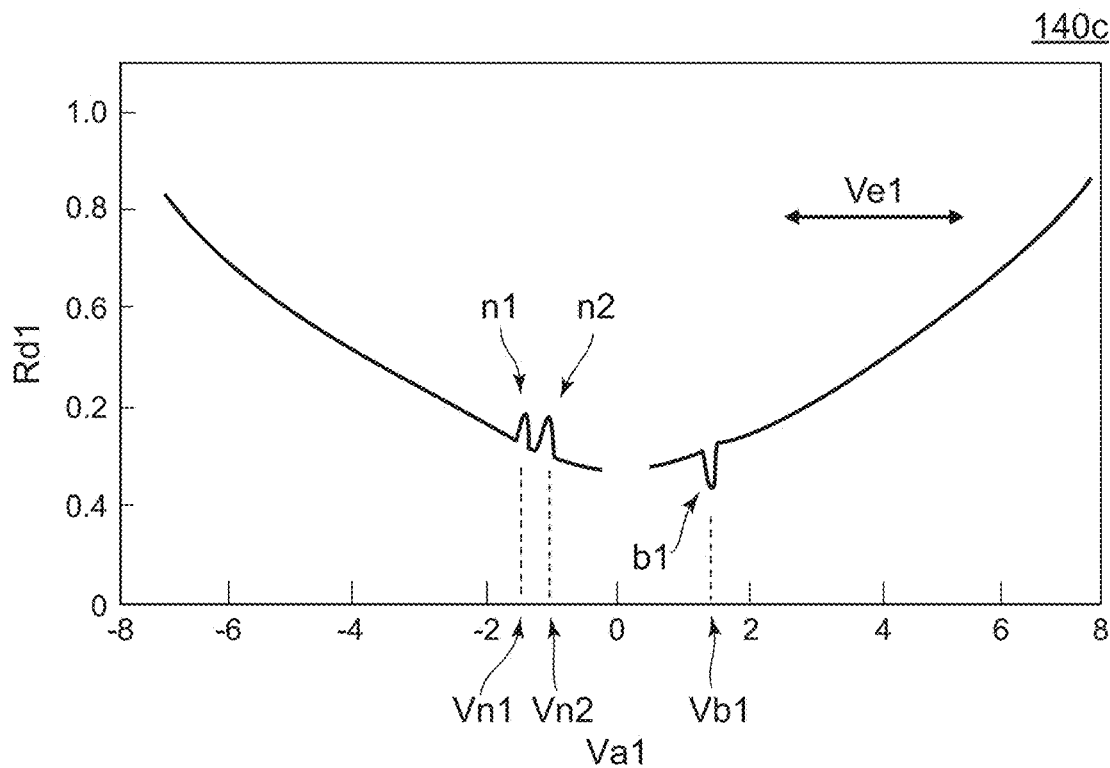
FIG. 17 is a graph illustrating characteristics of the magnetic head according to the first embodiment.

As shown in FIG. 17, in the magnetic head 140c, the differential electrical resistance Rd1 includes the first negative peak n1, a second negative peak n2, and the first positive bottom b1. The voltage Va1 corresponding to the second negative peak n2 is a second negative peak voltage Vn2. The second negative peak voltage Vn2 is negative. The element voltage Ve1 is higher than the peak voltage (the first negative peak voltage Vn1 and the second negative peak voltage Vn2) and higher than the bottom voltage (the first positive bottom voltage Vb1). A stable and high-intensity oscillation can be obtained.

Figure 18:
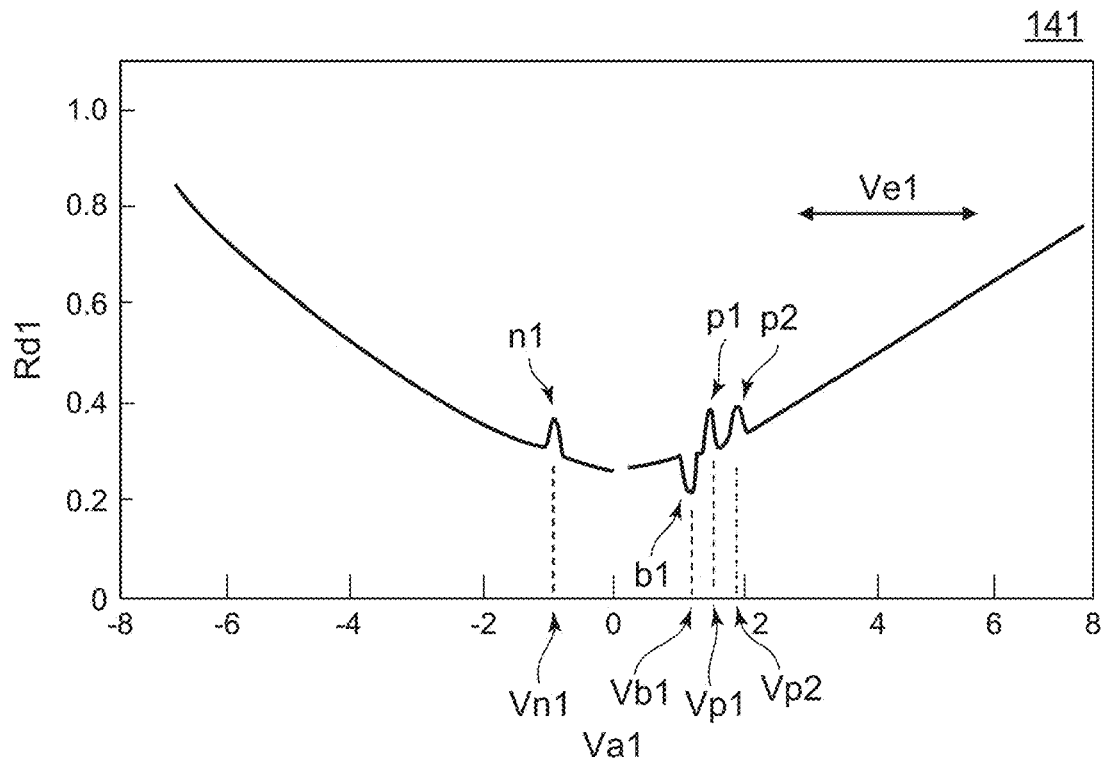
FIG. 18 is a graph illustrating characteristics of the magnetic head according to the first embodiment.

As shown in FIG. 18, in the magnetic head 141, the differential electrical resistance Rd1 includes the first negative peak n1, the first positive bottom b1, the first positive peak p1, and the second positive peak p2. The element voltage Ve1 is higher than the peak voltages (first negative peak voltage Vn1, first positive peak voltage Vp1, and second positive peak voltage Vp2) and higher than the bottom voltage (first positive bottom voltage Vb1). A stable and high-intensity oscillation can be obtained.

Figure 19:
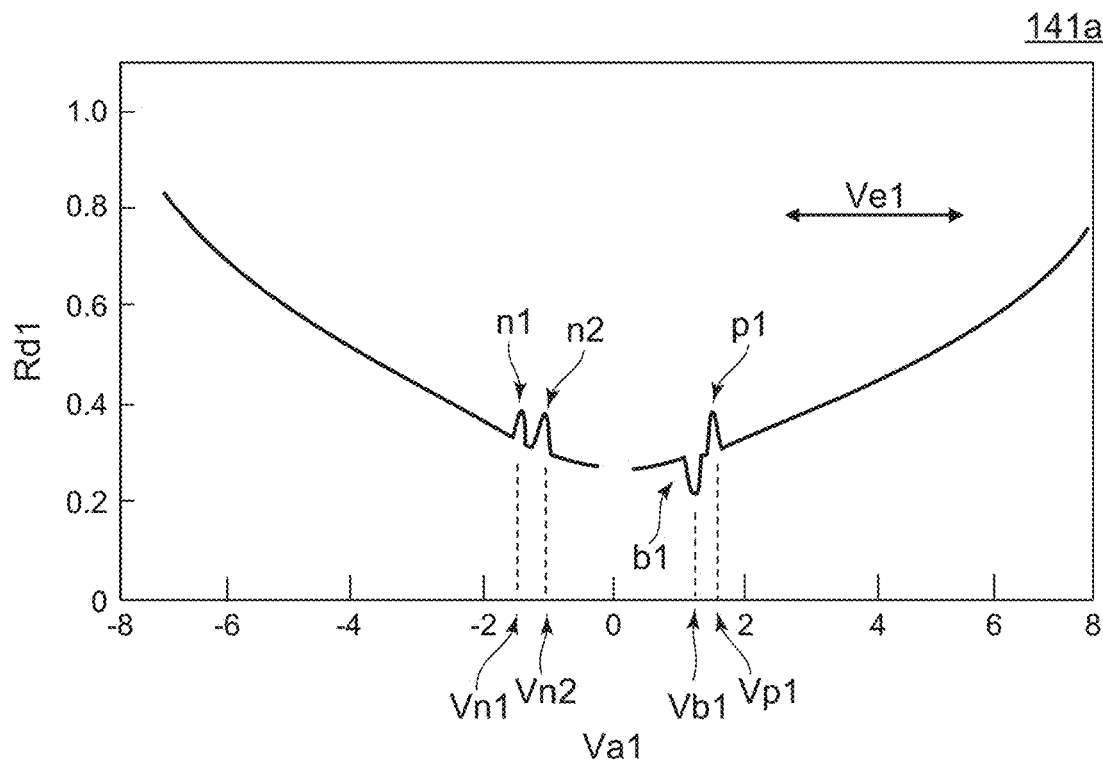
FIG. 19 is a graph illustrating characteristics of the magnetic head according to the first embodiment.

As shown in FIG. 19, in the magnetic head 141a, the differential electrical resistance Rd1 includes the first negative peak n1, the second negative peak n2, the first positive bottom b1 and the first positive peak p1. The element voltage Ve1 is higher than the peak voltages (first negative peak voltage Vn1, second negative peak voltage Vn2, and first positive peak voltage Vp1) and higher than the bottom voltage (first positive bottom voltage Vb1). A stable and high-intensity oscillation can be obtained.

Figure 20:
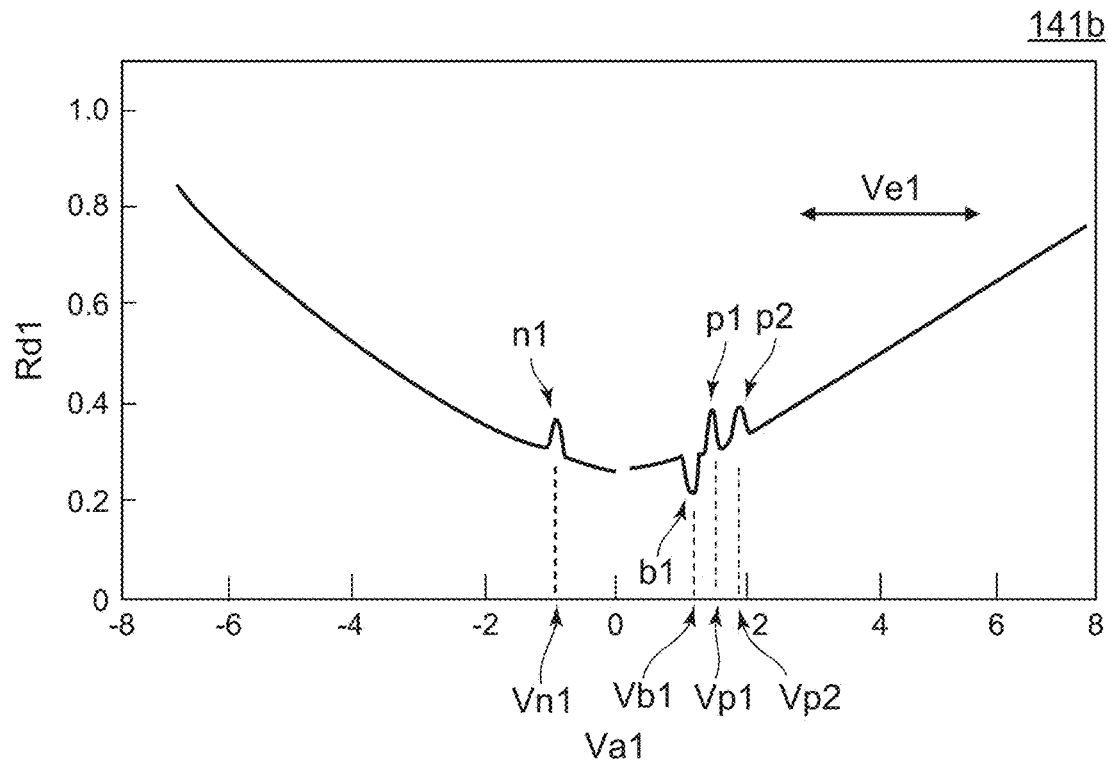
FIG. 20 is a graph illustrating characteristics of the magnetic head according to the first embodiment.

As shown in FIG. 20, in the magnetic head 141b, the differential electrical resistance Rd1 includes the first negative peak n1, the first positive bottom b1, the first positive peak p1, and the second positive peak p2. The element voltage Ve1 is higher than the peak voltages (first negative peak voltage Vn1, first positive peak voltage Vp1, and second positive peak voltage Vp2) and higher than the bottom voltage (first positive bottom voltage Vb1). A stable and high-intensity oscillation can be obtained.

Figure 21:
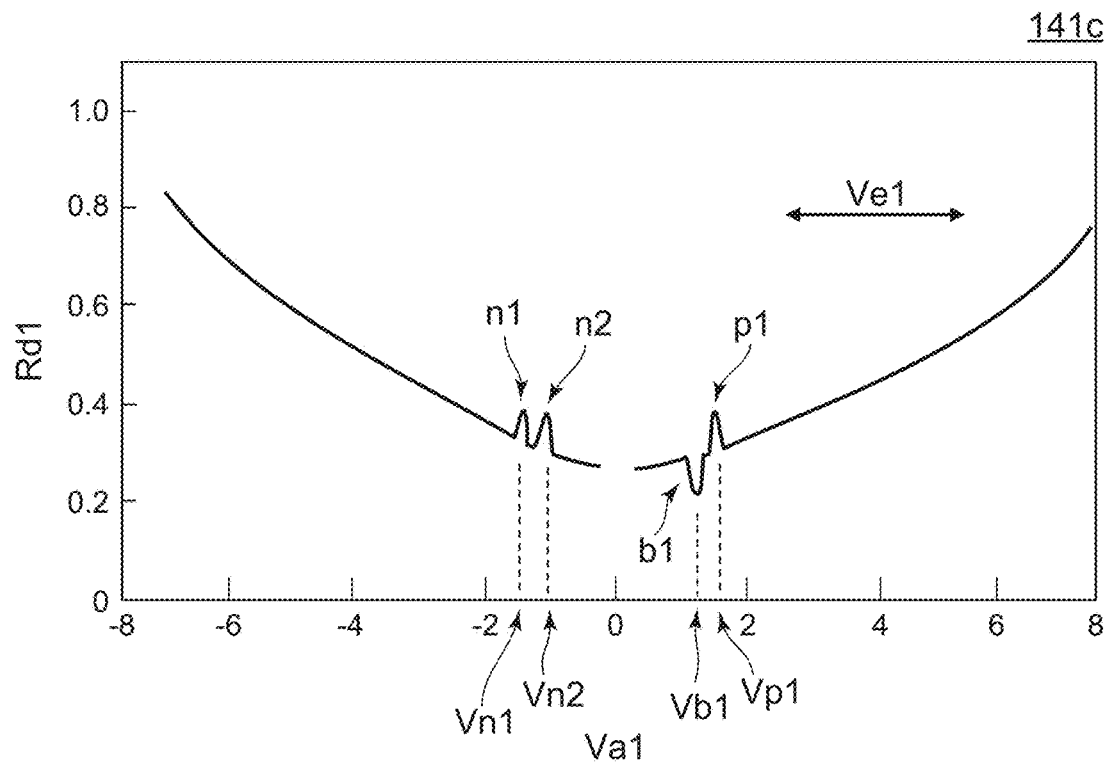
FIG. 21 is a graph illustrating characteristics of the magnetic head according to the first embodiment.

As shown in FIG. 21, in the magnetic head 141c, the differential electrical resistance Rd1 includes the first negative peak n1, the second negative peak n2, the first positive bottom b1, and the first positive peak p1. The element voltage Ve1 is higher than the peak voltages (first negative peak voltage Vn1, second negative peak voltage Vn2, and first positive peak voltage Vp1) and higher than the bottom voltage (first positive bottom voltage Vb1). A stable and high-intensity oscillation can be obtained.

Figure 22:
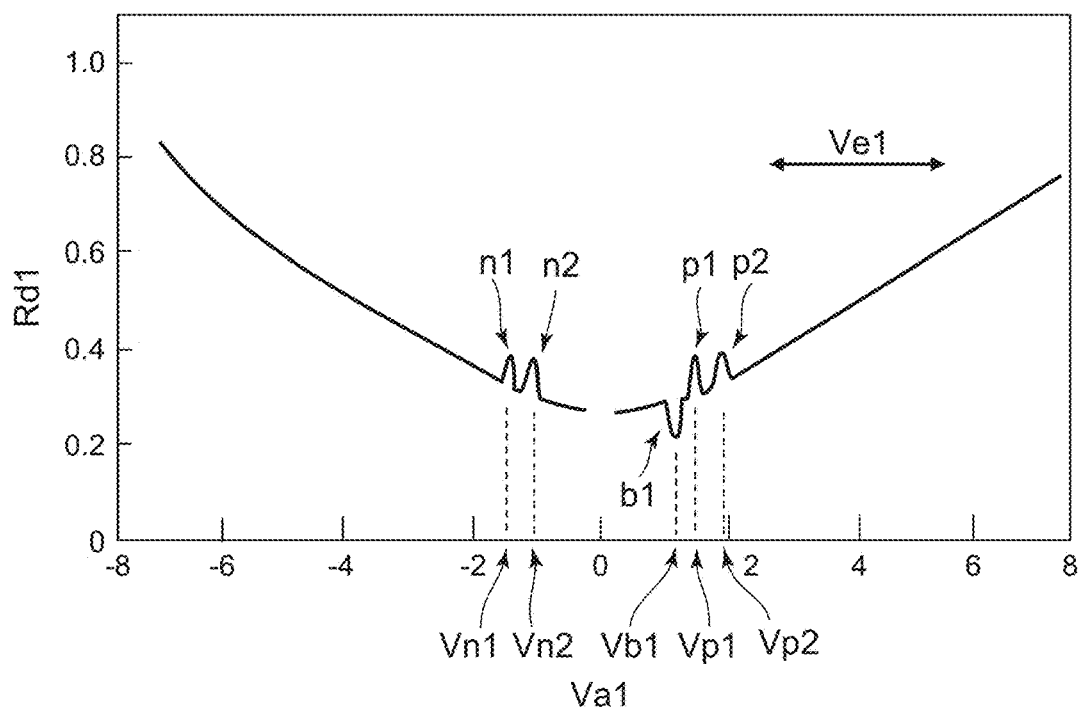
FIG. 22 is a graph illustrating characteristics of the magnetic head according to the first embodiment.

As shown in FIG. 22, in the magnetic head 142, the differential electrical resistance Rd1 has the first negative peak n1, the second negative peak n2, the first positive bottom b1, the first positive peak p1, and the second positive peak p2. The element voltage Ve1 is higher than the peak voltages (the first negative peak voltage Vn1, the second negative peak voltage Vn2, the first positive peak voltage Vp1, and the second positive peak voltage Vp2) and the bottom voltage (the first positive bottom voltage Vb1). A stable and high-intensity oscillation can be obtained.

In the magnetic heads 140, 140 a, 140 b, 140 c, 141, 141 a, 141 b, 141 c and 142, the element voltage Vd1 is 10 times or less of the peak voltage, which is the reference for setting the element voltage Vd1 and 10 times or less of the bottom voltage, which is the reference for setting the element voltage Vd1. The element voltage Ve1 may be 8 times or less of the peak voltage, which is the reference for setting the element voltage Ve1 or 8 times or less of the bottom voltage, which is the reference for setting the element voltage Ve1.

In embodiments, the tail of one peak may overlap the adjacent peak. The tail of one peak may overlap one bottom. The tail of one bottom may overlap adjacent peaks. The tail of one bottom may overlap adjacent bottom.

In the embodiment, the absolute value of the peak voltage, which is used as the reference for setting the element voltage Ve1, may be 4 times or less the absolute value of the other peak voltages. The absolute value of the above peak voltage, which is the reference for setting the element voltage Ve1, may be 3 times or less the absolute value of the other peak voltages.

In the embodiments, the first magnetic pole 31 may include a plurality of magnetic regions arranged along the X-axis direction. The second magnetic pole 32 may include a plurality of magnetic regions arranged along the X-axis direction. The boundaries between multiple magnetic regions may be clear or unclear. For example, the multiple magnetic regions are continuous.

Examples of other configurations of the magnetic recording device according to the embodiment will be described below. An example in which the magnetic head 140 is used will be described below. In the following description, the "magnetic head" may be any magnetic head (or any variation thereof) according to the embodiment.

Figure 23:
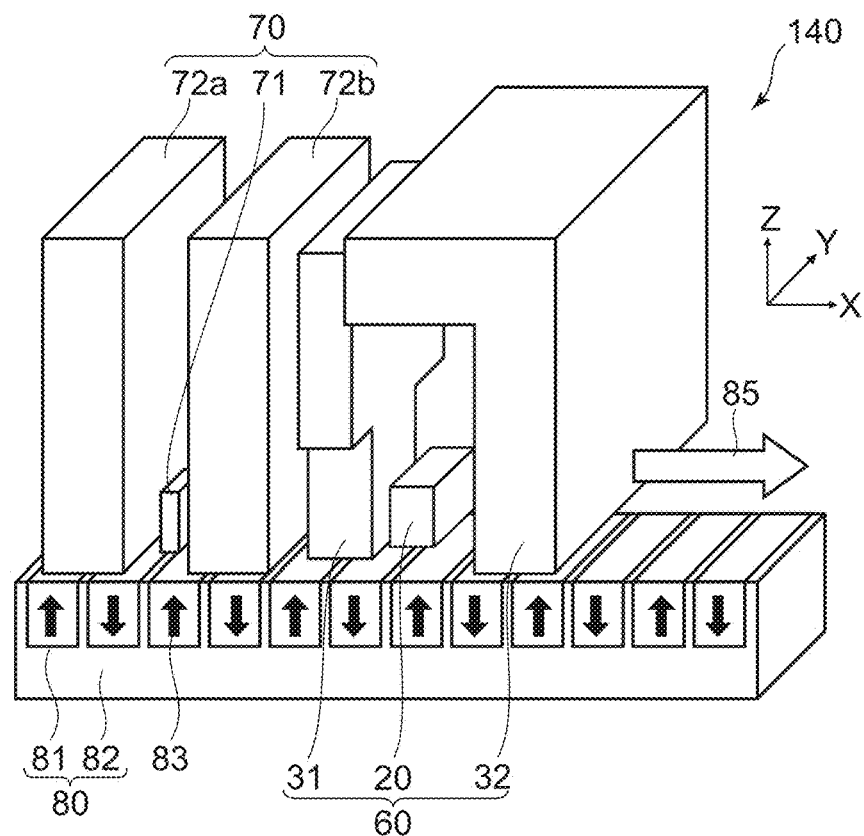
FIG. 23 is a schematic perspective view illustrating the magnetic recording device according to the embodiment.

FIG. 23 is a schematic perspective view illustrating the magnetic recording device according to the embodiment.

As shown in FIG. 23, the magnetic head (for example, the magnetic head 140) according to the embodiment is used together with the magnetic recording medium 80. In this example, the magnetic head 140 includes a recording section 60 and a reproducing section 70. Information is recorded on the magnetic recording medium 80 by the recording section 60 of the magnetic head 140. Information recorded on the magnetic recording medium 80 is reproduced by the reproducing section 70.

The magnetic recording medium 80 includes, for example, a medium substrate 82 and a magnetic recording layer 81 provided on the medium substrate 82. The magnetization 83 of the magnetic recording layer 81 is controlled by the recording section 60.

The reproducing section 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 is configured to output a signal corresponding to the magnetization 83 of the magnetic recording layer 81.

As shown in FIG. 23, the magnetic recording medium 80 moves relative to the magnetic head 140 in a direction of medium movement 85. Information corresponding to the magnetization 83 of the magnetic recording layer 81 is controlled at an arbitrary position by the magnetic head 140. Information corresponding to the magnetization 83 of the magnetic recording layer 81 is reproduced at an arbitrary position by the magnetic head 140.

Figure 24:
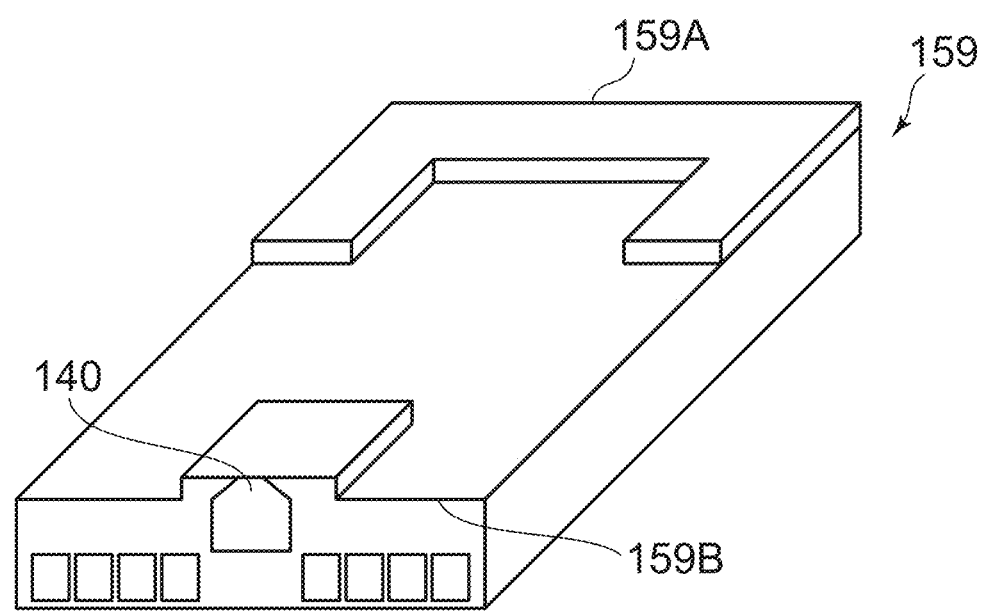
FIG. 24 is a schematic perspective view illustrating a part of the magnetic recording device according to the embodiment.

FIG. 24 is a schematic perspective view illustrating a part of the magnetic recording device according to the embodiment.

FIG. 24 illustrates a head slider.

The magnetic head 140 is provided on the head slider 159. The head slider 159 includes, for example, $Al_2O_3$/TIC or the like. The head slider 159 moves relative to the magnetic recording medium while floating or in contact with the magnetic recording medium.

The head slider 159 includes, for example, an air inflow side 159A and an air outflow side 159B. The magnetic head 140 is arranged on the side surface of the air outflow side 159B of the head slider 159 or the like. As a result, the magnetic head 140 moves relative to the magnetic recording medium while flying above or in contact with the magnetic recording medium.

Figure 25:
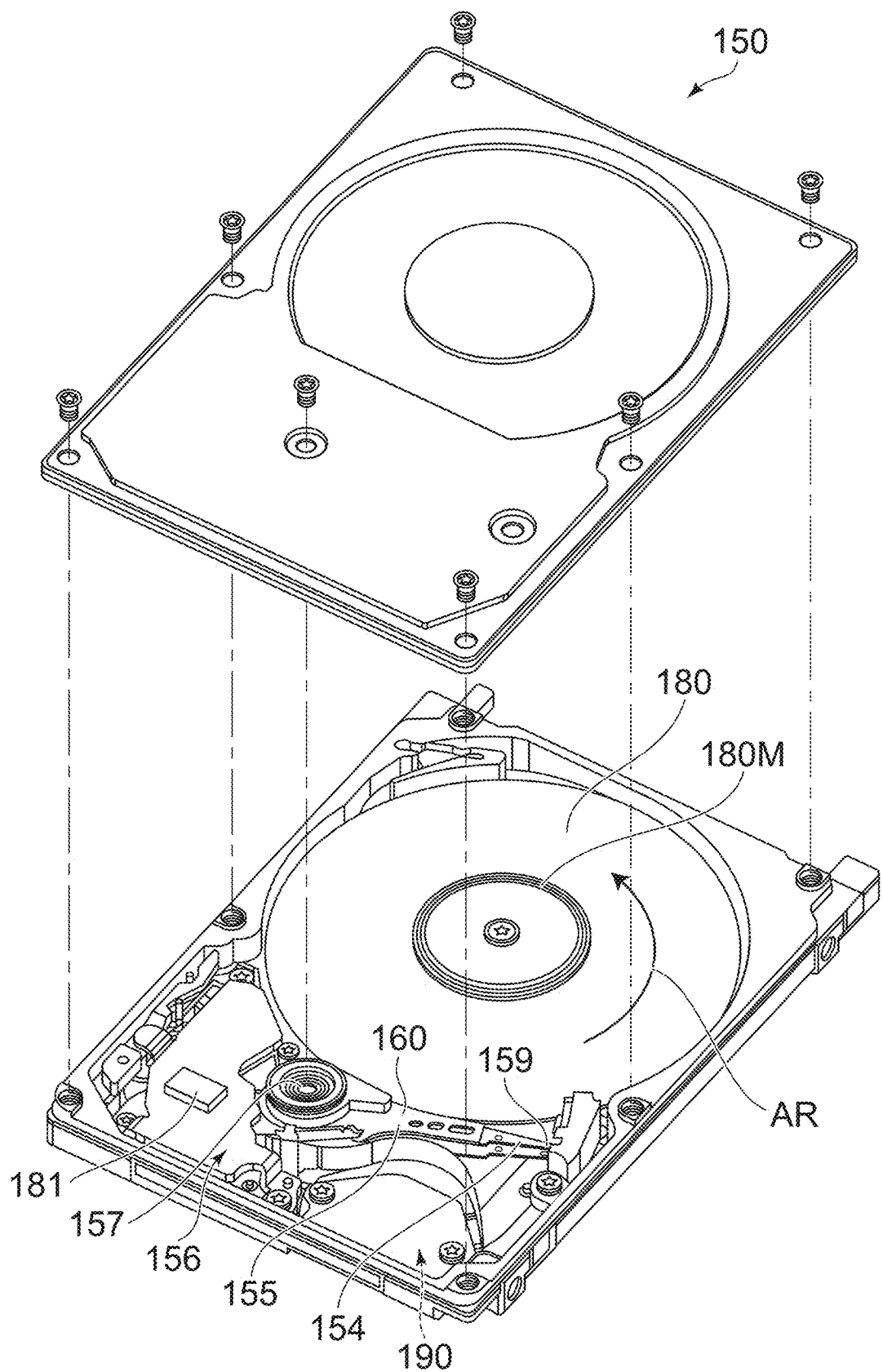
FIG. 25 is a schematic perspective view illustrating the magnetic recording device according to the embodiment.

FIG. 25 is a schematic perspective view illustrating the magnetic recording device according to the embodiment.

Figure 26A:
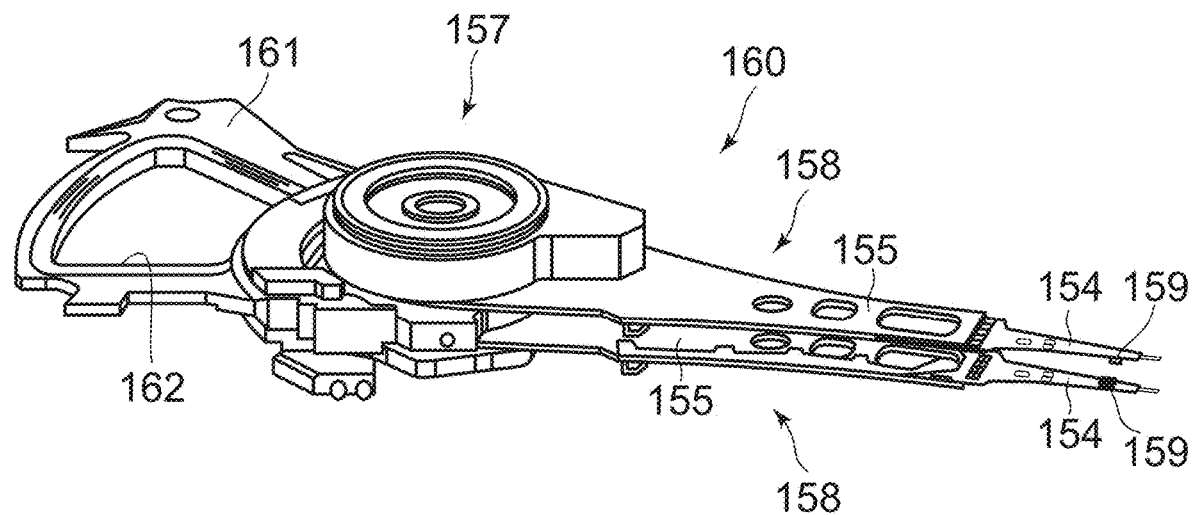
FIGS. 26A and 26B are schematic perspective views illustrating a part of the magnetic recording device according to the embodiment.
Figure 26B:
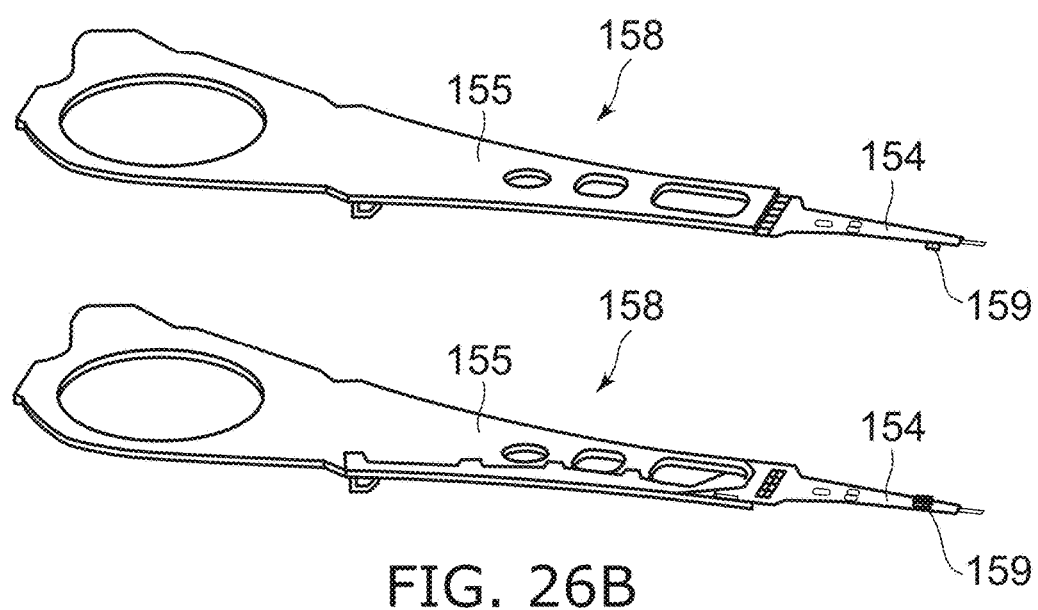

FIGS. 26A and 26B are schematic perspective views illustrating a part of the magnetic recording device according to the embodiment.

As shown in FIG. 25, in a magnetic recording device 150 according to the embodiment, a rotary actuator is used. The recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension 154. A magnetic head according to the embodiment is provided near the end of the head slider 159.

While the recording medium disk 180 is rotating, the pressing pressure by the suspension 154 and the floating pressure generated at the medium facing surface (ABS) of the head slider 159 are balanced. The distance between the medium facing surface of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. The magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

FIG. 26A is an enlarged perspective view of the head stack assembly 160, illustrating the configuration of a part of the magnetic recording device.

FIG. 26B is a perspective view illustrating the magnetic head assembly (head gimbal assembly: HGA) 158 that forms part of the head stack assembly 160.

As shown in FIG. 26A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 26B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 (head gimbal assembly) according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

The embodiments may include the following configurations (for example, technical proposals).

Configuration 1
  A magnetic head, comprising:
  a first magnetic pole;
  a second magnetic pole; and
  a magnetic element provided between the first magnetic pole and the second magnetic pole,
  the magnetic element including
  a first magnetic layer,
  a second magnetic layer provided between the first magnetic layer and the second magnetic pole,
  a third magnetic layer provided between the second magnetic layer and the second magnetic pole,
  a fourth magnetic layer provided between the third magnetic layer and the second magnetic pole,
  a fifth magnetic layer provided between the fourth magnetic layer and the second magnetic pole,
  a first non-magnetic layer provided between the first magnetic pole and the first magnetic layer,
  a second non-magnetic layer provided between the first magnetic layer and the second magnetic layer,
  a third non-magnetic layer provided between the second magnetic layer and the third magnetic layer,
  a fourth non-magnetic layer provided between the third magnetic layer and the fourth magnetic layer,
  a fifth non-magnetic layer provided between the fourth magnetic layer and the fifth magnetic layer,
  a sixth non-magnetic layer provided between the fifth magnetic layer and the second magnetic pole,
  the fifth magnetic layer including a first element and at least one of Fe, Co or Ni, the first element including at least one selected from the group consisting of Cr, V, Mn, Ti, N and Sc,
  the fifth non-magnetic layer including at least one selected from the group consisting of Ru, Ir, Ta, Rh, Pd, Pt and W, and
  the sixth non-magnetic layer including at least one selected from the group consisting of Cu, Au, Cr, Al, V and Ag.

Configuration 2
  The magnetic head according to Configuration 1, wherein
  the first magnetic layer, the second magnetic layer, the third magnetic layer and the fourth magnetic layer include at least one of Fe, Co or Ni, and
  the first magnetic layer, the second magnetic layer, the third magnetic layer, and the fourth magnetic layer do not include the first element, or a concentration of the first element in the first magnetic layer, the second magnetic layer, the third magnetic layer, and the fourth magnetic layer is lower than a concentration of the first element in the fifth magnetic layer.

Configuration 3
  The magnetic head according to Configuration 2, wherein
  the fifth non-magnetic layer contacts the fifth magnetic layer, and
  the sixth non-magnetic layer contacts the fifth magnetic layer and the second magnetic pole.

Configuration 4
  The magnetic head according to Configuration 3, wherein
  the first non-magnetic layer includes at least one selected from the group consisting of Ru, Ir, Ta, Rh, Pd, Pt and W,
  the second non-magnetic layer includes at least one selected from the group consisting of Cu, Au, Cr, Al, V and Ag,
  the third non-magnetic layer includes at least one selected from the group consisting of Ru, Ir, Ta, Rh, Pd, Pt and W, the fourth non-magnetic layer includes at least one selected from the group consisting of Cu, Au, Cr, Al, V and Ag, a second thickness of the second magnetic layer in a first direction from the first magnetic pole to the second magnetic pole is thicker than a first thickness of the first magnetic layer in the first direction, a third thickness of the third magnetic layer in the first direction is thinner than the second thickness, a fourth thickness of the fourth magnetic layer in the first direction is thicker than the third thickness, and a fifth thickness of the fifth magnetic layer in the first direction is thinner than the fourth thickness.

Configuration 5

The magnetic head according to Configuration 3, wherein the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, and the fourth non-magnetic layer includes at least one selected from the group consisting of Cu, Au, Cr, Al, V and Ag, a second thickness of the second magnetic layer in a first direction from the first magnetic pole to the second magnetic pole is thinner than a first thickness of the first magnetic layer in the first direction, a third thickness of the third magnetic layer in the first direction is thinner than the first thickness, a fourth thickness of the fourth magnetic layer in the first direction is thicker than the third thickness, and a fifth thickness of the fifth magnetic layer in the first direction is thinner than the fourth thickness.

Configuration 6

The magnetic head according to Configuration 3, wherein the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, the fourth non-magnetic layer includes at least one selected from the group consisting of Cu, Au, Cr, Al, V and Ag, a second thickness of the second magnetic layer in a first direction from the first magnetic pole to the second magnetic pole is thicker than a first thickness of the first magnetic layer in the first direction, a third thickness of the third magnetic layer in the first direction is thicker than the first thickness, a fourth thickness of the fourth magnetic layer in the first direction is thinner than the third thickness, and a fifth thickness of the fifth magnetic layer in the first direction is thinner than the third thickness.

Configuration 7

The magnetic head according to Configuration 3, wherein the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, the fourth non-magnetic layer includes at least one selected from the group consisting of Cu, Au, Cr, Al, V and Ag, a second thickness of the second magnetic layer in a first direction from the first magnetic pole to the second magnetic pole is thinner than a first thickness of the first magnetic layer in the first direction, a third thickness of the third magnetic layer in the first direction is thicker than the second thickness, a fourth thickness of the fourth magnetic layer in the first direction is thinner than the third thickness, and a fifth thickness of the fifth magnetic layer in the first direction is thinner than the third thickness.

Configuration 8

The magnetic head according to Configuration 3, wherein the magnetic element further includes a sixth magnetic layer and a seventh non-magnetic layer, the sixth magnetic layer is provided between the second magnetic layer and the third magnetic layer, the seventh non-magnetic layer is provided between the second magnetic layer and the sixth magnetic layer, the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the seventh non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, the fourth non-magnetic layer includes at least one selected from the group consisting of Cu, Au, Cr, Al, V and Ag, a second thickness of the second magnetic layer in a first direction from the first magnetic pole to the second magnetic pole is thicker than a first thickness of the first magnetic layer in the first direction, a sixth thickness of the sixth magnetic layer in the first direction is thinner than the second thickness, a third thickness of the third magnetic layer in the first direction is thinner than the second thickness, a fourth thickness of the fourth magnetic layer in the first direction is thicker than the third thickness, and a fifth thickness of the fifth magnetic layer in the first direction is thinner than the fourth thickness.

Configuration 9

The magnetic head according to Configuration 3, wherein the magnetic element further includes a sixth magnetic layer and a seventh non-magnetic layer, the sixth magnetic layer is provided between the second magnetic layer and the third magnetic layer, the seventh non-magnetic layer is provided between the second magnetic layer and the sixth magnetic layer, the first non-magnetic layer includes at least one selected from the group consisting of Ru, Ir, Ta, Rh, Pd, Pt and W;

the second non-magnetic layer includes at least one selected from the group consisting of Cu, Au, Cr, Al, V and Ag,
the seventh non-magnetic layer includes at least one selected from the group consisting of Cu, Au, Cr, Al, V and Ag,
the third non-magnetic layer includes at least one selected from the group consisting of Ru, Ir, Ta, Rh, Pd, Pt and W,
the fourth non-magnetic layer includes at least one selected from the group consisting of Cu, Au, Cr, Al, V and Ag,
a second thickness of the second magnetic layer in a first direction from the first magnetic pole to the second magnetic pole is thicker than a first thickness of the first magnetic layer in the first direction,
a sixth thickness of the sixth magnetic layer in the first direction is thinner than the second thickness,
a third thickness of the third magnetic layer in the first direction is thicker than the first thickness,
a fourth thickness of the fourth magnetic layer in the first direction is thinner than the third thickness, and
the fifth thickness of the fifth magnetic layer in the first direction is thinner than the third thickness.

Configuration 10

The magnetic head according to Configuration 3, wherein
the magnetic element further includes a sixth magnetic layer and a seventh non-magnetic layer,
the sixth magnetic layer is provided between the second magnetic layer and the third magnetic layer,
the seventh non-magnetic layer is provided between the second magnetic layer and the sixth magnetic layer,
the first non-magnetic layer includes at least one selected from the group consisting of Ru, Ir, Ta, Rh, Pd, Pt and W,
a second non-magnetic layer includes at least one selected from the group consisting of Cu, Au, Cr, Al, V and Ag,
a seventh non-magnetic layer includes at least one selected from the group consisting of Ru, Ir, Ta, Rh, Pd, Pt and W,
a third non-magnetic layer includes at least one selected from the group consisting of Cu, Au, Cr, Al, V and Ag,
a fourth non-magnetic layer includes at least one selected from the group consisting of Cu, Au, Cr, Al, V and Ag,
a second thickness of the second magnetic layer in a first direction from the first magnetic pole to the second magnetic pole is thicker than a first thickness of the first magnetic layer in the first direction,
a sixth thickness of the sixth magnetic layer in the first direction is thinner than the second thickness,
a third thickness of the third magnetic layer in the first direction is thicker than the first thickness,
a fourth thickness of the fourth magnetic layer in the first direction is thinner than the third thickness, and
a fifth thickness of the fifth magnetic layer in the first direction is thinner than the third thickness.

Configuration 11

The magnetic head according to Configuration 3, wherein
the sixth magnetic layer is provided between the second magnetic layer and the third magnetic layer,
the seventh non-magnetic layer is provided between the second magnetic layer and the sixth magnetic layer,
the first non-magnetic layer includes at least one selected from the group consisting of Ru, Ir, Ta, Rh, Pd, Pt and W,
the second non-magnetic layer includes at least one selected from the group consisting of Cu, Au, Cr, Al, V and Ag,
the seventh non-magnetic layer includes at least one selected from the group consisting of Ru, Ir, Ta, Rh, Pd, Pt and W,
the third non-magnetic layer includes at least one selected from the group consisting of Cu, Au, Cr, Al, V and Ag,
the fourth non-magnetic layer includes at least one selected from the group consisting of Cu, Au, Cr, Al, V and Ag,
a second thickness of the second magnetic layer in a first direction from the first magnetic pole to the second magnetic pole is thinner than a first thickness of the first magnetic layer in the first direction,
a sixth thickness of the sixth magnetic layer in the first direction is thinner than the first thickness,
a third thickness of the third magnetic layer in the first direction is thicker than the second thickness,
a fourth thickness of the fourth magnetic layer in the first direction is thinner than the third thickness, and
a fifth thickness of the fifth magnetic layer in the first direction is thinner than the third thickness.

Configuration 12

The magnetic head according to Configuration 3, wherein
the magnetic element further includes a sixth magnetic layer, a seventh magnetic layer, a seventh non-magnetic layer, and an eighth non-magnetic layer,
the sixth magnetic layer is provided between the second magnetic layer and the third magnetic layer,
the seventh non-magnetic layer is provided between the second magnetic layer and the sixth magnetic layer,
the seventh magnetic layer is provided between the fourth magnetic layer and the fifth magnetic layer,
the eighth non-magnetic layer is provided between the fourth magnetic layer and the seventh magnetic layer,
the first non-magnetic layer includes at least one selected from the group consisting of Ru, Ir, Ta, Rh, Pd, Pt and W,
the second non-magnetic layer includes at least one selected from the group consisting of Cu, Au, Cr, Al, V and Ag,
the seventh non-magnetic layer includes at least one selected from the group consisting of Cu, Au, Cr, Al, V and Ag,
the third non-magnetic layer includes at least one selected from the group consisting of Ru, Ir, Ta, Rh, Pd, Pt and W,
the fourth non-magnetic layer includes at least one selected from the group consisting of Cu, Au, Cr, Al, V and Ag,
the eighth non-magnetic layer includes at least one selected from the group consisting of Cu, Au, Cr, Al, V and Ag,
a second thickness of the second magnetic layer in a first direction from the first magnetic pole to the second magnetic pole is thicker than a first thickness of the first magnetic layer in the first direction,
a sixth thickness of the sixth magnetic layer in the first direction is thinner than the second thickness,
a third thickness of the third magnetic layer in the first direction is thinner than the second thickness,
a fourth thickness of the fourth magnetic layer in the first direction is thicker than the third thickness,
a seventh thickness of the seventh magnetic layer in the first direction is thinner than the fourth thickness, and the fifth thickness of the fifth magnetic layer in the first direction is thinner than the fourth thickness.

Configuration 13

The magnetic head according to any one of Configurations 1-12, wherein
one end of the magnetic element is electrically connected to the first magnetic pole,
another end of the magnetic element is electrically connected to the second magnetic pole, and
a differential electrical resistance of the magnetic element when changing a voltage between the first magnetic pole and the second magnetic pole includes at least one peak and at least one bottom.

Configuration 14

A magnetic recording device, comprising:
the magnetic head according to any one of Configurations 1-12; and
a controller including an element circuit,
one end of the magnetic element being electrically connected to the first magnetic pole,
another end of the magnetic element being electrically connected to the second magnetic pole,
the element circuit being configured to apply an element voltage between the first magnetic pole and the second magnetic pole, and
when the element voltage is applied, a potential of the first magnetic pole being lower than a potential of the second magnetic pole.

Configuration 15

The magnetic recording device according to Configuration 14, wherein
a differential electrical resistance of the magnetic element when a voltage between the first magnetic pole and the second magnetic pole is changed includes at least one peak and at least one bottom,
the voltage corresponding to the at least one peak is a peak voltage,
the voltage corresponding to the at least one bottom is a bottom voltage, and
the device voltage is higher than the peak voltage and higher than the bottom voltage.

According to the embodiments, it is possible to provide a magnetic head and a magnetic recording device capable of improving the recording density.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads and magnetic recording devices such as magnetic poles, magnetic elements, magnetic layers, non-magnetic layers, terminals, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads and magnetic recording devices practicable by an appropriate design modification by one skilled in the art based on the magnetic heads and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. A magnetic head, comprising:
a first magnetic pole;
a second magnetic pole; and
a magnetic element provided between the first magnetic pole and the second magnetic pole,
the magnetic element including
a first magnetic layer,
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a fifth magnetic layer provided between the fourth magnetic layer and the second magnetic pole,
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer,
a fifth non-magnetic layer provided between the fourth magnetic layer and the fifth magnetic layer,
a sixth non-magnetic layer provided between the fifth magnetic layer and the second magnetic pole,
the fifth magnetic layer including a first element and at least one of Fe, Co or Ni, the first element including at least one selected from the group consisting of Cr, V, Mn, Ti, N and Sc,
the fifth non-magnetic layer including at least one selected from the group consisting of Ru, Ir, Ta, Rh, Pd, Pt and W, and
the sixth non-magnetic layer including at least one selected from the group consisting of Cu, Au, Cr, Al, V and Ag,
wherein the first magnetic layer, the second magnetic layer, the third magnetic layer and the fourth magnetic layer include at least one of Fe, Co or Ni,
wherein the first magnetic layer, the second magnetic layer, the third magnetic layer, and the fourth magnetic layer do not include the first element, or a concentration of the first element in the first magnetic layer, the second magnetic layer, the third magnetic layer, and the fourth magnetic layer is lower than a concentration of the first element in the fifth magnetic layer, and wherein the fifth non-magnetic layer contacts the fifth magnetic layer, and the sixth non-magnetic layer contacts the fifth magnetic layer and the second magnetic pole.

2. The magnetic head according to claim 1, wherein the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, the fourth non-magnetic layer includes at least one selected from the group consisting of Cu, Au, Cr, Al, V and Ag, a second thickness of the second magnetic layer in a first direction from the first magnetic pole to the second magnetic pole is thicker than a first thickness of the first magnetic layer in the first direction, a third thickness of the third magnetic layer in the first direction is thinner than the second thickness, a fourth thickness of the fourth magnetic layer in the first direction is thicker than the third thickness, and a fifth thickness of the fifth magnetic layer in the first direction is thinner than the fourth thickness.

3. The magnetic head according to claim 1, wherein the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, and the fourth non-magnetic layer includes at least one selected from the group consisting of Cu, Au, Cr, Al, V and Ag, a second thickness of the second magnetic layer in a first direction from the first magnetic pole to the second magnetic pole is thinner than a first thickness of the first magnetic layer in the first direction, a third thickness of the third magnetic layer in the first direction is thinner than the first thickness, a fourth thickness of the fourth magnetic layer in the first direction is thicker than the third thickness, and a fifth thickness of the fifth magnetic layer in the first direction is thinner than the fourth thickness.

4. The magnetic head according to claim 1, wherein the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, the fourth non-magnetic layer includes at least one selected from the group consisting of Cu, Au, Cr, Al, V and Ag, a second thickness of the second magnetic layer in a first direction from the first magnetic pole to the second magnetic pole is thicker than a first thickness of the first magnetic layer in the first direction, a third thickness of the third magnetic layer in the first direction is thicker than the first thickness, a fourth thickness of the fourth magnetic layer in the first direction is thinner than the third thickness, and a fifth thickness of the fifth magnetic layer in the first direction is thinner than the third thickness.

5. The magnetic head according to claim 1, wherein the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, the fourth non-magnetic layer includes at least one selected from the group consisting of Cu, Au, Cr, Al, V and Ag, a second thickness of the second magnetic layer in a first direction from the first magnetic pole to the second magnetic pole is thinner than a first thickness of the first magnetic layer in the first direction, a third thickness of the third magnetic layer in the first direction is thicker than the second thickness, a fourth thickness of the fourth magnetic layer in the first direction is thinner than the third thickness, and a fifth thickness of the fifth magnetic layer in the first direction is thinner than the third thickness.

6. The magnetic head according to claim 1, wherein the magnetic element further includes a sixth magnetic layer and a seventh non-magnetic layer, the sixth magnetic layer is provided between the second magnetic layer and the third magnetic layer, the seventh non-magnetic layer is provided between the second magnetic layer and the sixth magnetic layer, the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the seventh non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, the fourth non-magnetic layer includes at least one selected from the group consisting of Cu, Au, Cr, Al, V and Ag, a second thickness of the second magnetic layer in a first direction from the first magnetic pole to the second magnetic pole is thicker than a first thickness of the first magnetic layer in the first direction, a sixth thickness of the sixth magnetic layer in the first direction is thinner than the second thickness, a third thickness of the third magnetic layer in the first direction is thinner than the second thickness, a fourth thickness of the fourth magnetic layer in the first direction is thicker than the third thickness, and a fifth thickness of the fifth magnetic layer in the first direction is thinner than the fourth thickness.

7. The magnetic head according to claim 1, wherein
the magnetic element further includes a sixth magnetic layer and a seventh non-magnetic layer,
the sixth magnetic layer is provided between the second magnetic layer and the third magnetic layer,
the seventh non-magnetic layer is provided between the second magnetic layer and the sixth magnetic layer,
the first non-magnetic layer includes at least one selected from the group consisting of Ru, Ir, Ta, Rh, Pd, Pt and W;
the second non-magnetic layer includes at least one selected from the group consisting of Cu, Au, Cr, Al, V and Ag,
the seventh non-magnetic layer includes at least one selected from the group consisting of Cu, Au, Cr, Al, V and Ag,
the third non-magnetic layer includes at least one selected from the group consisting of Ru, Ir, Ta, Rh, Pd, Pt and W,
the fourth non-magnetic layer includes at least one selected from the group consisting of Cu, Au, Cr, Al, V and Ag,
a second thickness of the second magnetic layer in a first direction from the first magnetic pole to the second magnetic pole is thicker than a first thickness of the first magnetic layer in the first direction,
a sixth thickness of the sixth magnetic layer in the first direction is thinner than the second thickness,
a third thickness of the third magnetic layer in the first direction is thicker than the first thickness,
a fourth thickness of the fourth magnetic layer in the first direction is thinner than the third thickness, and
a fifth thickness of the fifth magnetic layer in the first direction is thinner than the third thickness.

8. The magnetic head according to claim 1, wherein
the magnetic element further includes a sixth magnetic layer and a seventh non-magnetic layer,
the sixth magnetic layer is provided between the second magnetic layer and the third magnetic layer,
the seventh non-magnetic layer is provided between the second magnetic layer and the sixth magnetic layer,
the first non-magnetic layer includes at least one selected from the group consisting of Ru, Ir, Ta, Rh, Pd, Pt and W,
the second non-magnetic layer includes at least one selected from the group consisting of Cu, Au, Cr, Al, V and Ag,
the seventh non-magnetic layer includes at least one selected from the group consisting of Ru, Ir, Ta, Rh, Pd, Pt and W,
the third non-magnetic layer includes at least one selected from the group consisting of Cu, Au, Cr, Al, V and Ag,
the fourth non-magnetic layer includes at least one selected from the group consisting of Cu, Au, Cr, Al, V and Ag,
a second thickness of the second magnetic layer in a first direction from the first magnetic pole to the second magnetic pole is thicker than a first thickness of the first magnetic layer in the first direction,
a sixth thickness of the sixth magnetic layer in the first direction is thinner than the second thickness,
a third thickness of the third magnetic layer in the first direction is thicker than the first thickness,
a fourth thickness of the fourth magnetic layer in the first direction is thinner than the third thickness, and
a fifth thickness of the fifth magnetic layer in the first direction is thinner than the third thickness.

9. The magnetic head according to claim 1, wherein the magnetic element further includes a sixth magnetic layer and a seventh non-magnetic layer,
the sixth magnetic layer is provided between the second magnetic layer and the third magnetic layer,
the seventh non-magnetic layer is provided between the second magnetic layer and the sixth magnetic layer,
the first non-magnetic layer includes at least one selected from the group consisting of Ru, Ir, Ta, Rh, Pd, Pt and W,
the second non-magnetic layer includes at least one selected from the group consisting of Cu, Au, Cr, Al, V and Ag,
the seventh non-magnetic layer includes at least one selected from the group consisting of Ru, Ir, Ta, Rh, Pd, Pt and W,
the third non-magnetic layer includes at least one selected from the group consisting of Cu, Au, Cr, Al, V and Ag,
the fourth non-magnetic layer includes at least one selected from the group consisting of Cu, Au, Cr, Al, V and Ag,
a second thickness of the second magnetic layer in a first direction from the first magnetic pole to the second magnetic pole is thinner than a first thickness of the first magnetic layer in the first direction,
a sixth thickness of the sixth magnetic layer in the first direction is thinner than the first thickness,
a third thickness of the third magnetic layer in the first direction is thicker than the second thickness,
a fourth thickness of the fourth magnetic layer in the first direction is thinner than the third thickness, and
a fifth thickness of the fifth magnetic layer in the first direction is thinner than the third thickness.

10. The magnetic head according to claim 1, wherein
the magnetic element further includes a sixth magnetic layer, a seventh magnetic layer, a seventh non-magnetic layer, and an eighth non-magnetic layer,
the sixth magnetic layer is provided between the second magnetic layer and the third magnetic layer,
the seventh non-magnetic layer is provided between the second magnetic layer and the sixth magnetic layer,
the seventh magnetic layer is provided between the fourth magnetic layer and the fifth magnetic layer,
the eighth non-magnetic layer is provided between the fourth magnetic layer and the seventh magnetic layer,
the first non-magnetic layer includes at least one selected from the group consisting of Ru, Ir, Ta, Rh, Pd, Pt and W,
the second non-magnetic layer includes at least one selected from the group consisting of Cu, Au, Cr, Al, V and Ag,
the seventh non-magnetic layer includes at least one selected from the group consisting of Cu, Au, Cr, Al, V and Ag,
the third non-magnetic layer includes at least one selected from the group consisting of Ru, Ir, Ta, Rh, Pd, Pt and W,
the fourth non-magnetic layer includes at least one selected from the group consisting of Cu, Au, Cr, Al, V and Ag,
the eighth non-magnetic layer includes at least one selected from the group consisting of Cu, Au, Cr, Al, V and Ag, a second thickness of the second magnetic layer in a first direction from the first magnetic pole to the second magnetic pole is thicker than a first thickness of the first magnetic layer in the first direction, a sixth thickness of the sixth magnetic layer in the first direction is thinner than the second thickness, a third thickness of the third magnetic layer in the first direction is thinner than the second thickness, a fourth thickness of the fourth magnetic layer in the first direction is thicker than the third thickness, a seventh thickness of the seventh magnetic layer in the first direction is thinner than the fourth thickness, and a fifth thickness of the fifth magnetic layer in the first direction is thinner than the fourth thickness.

11. The magnetic head according to claim 1, wherein one end of the magnetic element is electrically connected to the first magnetic pole, another end of the magnetic element is electrically connected to the second magnetic pole, and a differential electrical resistance of the magnetic element when changing a voltage between the first magnetic pole and the second magnetic pole includes at least one peak and at least one bottom.

12. A magnetic recording device, comprising:

the magnetic head according to claim 1; and a controller including an element circuit, one end of the magnetic element being electrically connected to the first magnetic pole, another end of the magnetic element being electrically connected to the second magnetic pole, the element circuit being configured to apply an element voltage between the first magnetic pole and the second magnetic pole, and when the element voltage is applied, a potential of the first magnetic pole is lower than a potential of the second magnetic pole.

13. The magnetic recording device according to claim 12, wherein a differential electrical resistance of the magnetic element when a voltage between the first magnetic pole and the second magnetic pole is changed includes at least one peak and at least one bottom, the voltage corresponding to the at least one peak is a peak voltage, the voltage corresponding to the at least one bottom is a bottom voltage, and the device voltage is higher than the peak voltage and higher than the bottom voltage.

* * * * *